United States Patent
Nam

(10) Patent No.: US 9,602,742 B2
(45) Date of Patent: Mar. 21, 2017

(54) IMAGING DEVICE AND METHOD FOR ACHIEVING WIDE DYNAMIC RANGE

(71) Applicant: INTELLECTUAL DISCOVERY CO., LTD., Seoul (KR)

(72) Inventor: Jung Hyun Nam, Suwon-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 163 days.

(21) Appl. No.: 14/282,109

(22) Filed: May 20, 2014

(65) Prior Publication Data

US 2014/0339397 A1 Nov. 20, 2014

(30) Foreign Application Priority Data

May 20, 2013 (KR) ............. 10-2013-0056627
May 20, 2013 (KR) ............. 10-2013-0056634
May 20, 2013 (KR) ............. 10-2013-0056637
May 20, 2013 (KR) ............. 10-2013-0056641

(51) Int. Cl.
*H01L 27/00* (2006.01)
*H04N 5/355* (2011.01)
*H04N 5/359* (2011.01)
*H04N 5/3745* (2011.01)

(52) U.S. Cl.
CPC ....... *H04N 5/35581* (2013.01); *H04N 5/3594* (2013.01); *H04N 5/3745* (2013.01); *H04N 5/37452* (2013.01)

(58) Field of Classification Search
CPC .......... H01L 27/14656; H04N 5/35581; H04N 5/37452
USPC ....................................... 250/208.1
See application file for complete search history.

(56) References Cited

U.S. PATENT DOCUMENTS

2011/0241079 A1* 10/2011 Oike ................ H01L 27/14616
257/225
2011/0242381 A1* 10/2011 Sakakibara ............ H04N 5/355
348/301
2013/0215310 A1* 8/2013 Toyoguchi ........ H01L 27/14806
348/308

* cited by examiner

*Primary Examiner* — Thanh Luu

(57) ABSTRACT

An imaging device including a plurality of pixels and a control circuit to apply a signal to the pixels, wherein the pixels include a photodiode formed on a substrate and a first terminal and a second terminal, a shift switching unit to be connected to the first terminal, a first storage node, a transfer switching unit, a second storage node, and a reset switching unit, when an operating mode is set as a first mode, the control circuit allows charges integrated in the photodiode to be shifted to the first storage node during a first interval and the second terminal during a second interval, and when the operating mode is set as a second mode, the charges integrated in the photodiode are not shifted to the second terminal.

11 Claims, 16 Drawing Sheets

IMAGING DEVICE AND METHOD FOR ACHIEVING WIDE DYNAMIC RANGE

CROSS-REFERENCE TO RELATED APPLICATION

This application claims the priority benefit of Korean Patent Applications No. 10-2013-0056627, No. 10-2013-0056634, No. 10-2013-0056637, and No. 10-2013-0056641, filed on May 20, 2013, in the Korean Intellectual Property Office, the disclosures of which are incorporated herein by reference.

BACKGROUND

1. Field of the Invention

The present invention relates to an imaging device and a method of driving the imaging device, and more particularly, to an imaging device and a method of driving the imaging device that may obtain a characteristic of high sensitivity both at a low luminance and at a high luminance.

Further, the present invention relates to an imaging device and a method of driving the imaging device that may selectively drive the imaging device to obtain a characteristic of high sensitivity at a low luminance or at a high luminance using identical pixels or to implement a global shutter suitable to capture an image of a fast moving object.

2. Description of the Related Art

An image sensor may operate by receiving an incident light using a unit pixel, converting the incident light to an electrical charge, generating a corresponding voltage signal, and outputting the signal. For example, one of parameters indicating a performance of a complementary metal oxide semiconductor (CMOS) image sensor is a dynamic range (DR), which is indicated as a ratio of minimum input signals detectable by the CMOS image sensor to maximum input signals that do not saturate the CMOS image sensor.

However, a conventional color image sensor may have a narrow DR and thus, may not express an original color of an image when at least one of red, green, and blue is in a saturated state. To overcome an issue of the narrow DR, a method of applying a wide dynamic range (WDR) pixel is proposed.

Conventionally, a method of increasing an electrical charge storing capability, or well capacity, of a photoelectric conversion area included in the CMOS image sensor, or a method of reducing dark current or noise such as fixed pattern noise (FPN) is used to increase the DR of the CMOS image sensor.

Also, an issue of image distortion may occur when a moving object is captured using a rolling shutter that may sequentially shift, by a row or a line, electrical charges integrated in a photoelectric converter, for example, a photodiode, included in a pixel array. Thus, a global shutter method that may simultaneously shift the charges integrated in the photoelectric converter included in the pixel array may be applied to capture a fast moving object.

However, a pixel used to achieve the WDR may not be suitable for the global shutter method to capture the object. Thus, the conventional image sensor may be used by applying separate methods of using the image sensor suitable for the global shutter method based on an environment in which the image sensor is used or using the image sensor suitable to obtain the WDR.

SUMMARY

An aspect of the present invention provides an imaging device and a method of driving the imaging device that may be suitable for obtaining a wide dynamic range (WDR).

Another aspect of the present invention also provides an imaging device and a method of driving the imaging device that may be suitable for both a global shutter and a WDR.

According to an aspect of the present invention, there is provided an imaging device including a plurality of pixels and a control circuit to apply a signal to the pixels. The pixels may include a photodiode including a first terminal and a second terminal, a shift switching unit to be connected to the first terminal, a first storage node to be disposed at one side of the shift switching unit, a transfer switching unit to be disposed at one side of the first storage node, a second storage node to be disposed at one side of the transfer switching unit, and a reset switching unit to be disposed at one side of the second storage node. When an operating mode is set as a first mode, the control circuit may allow charges integrated in the photodiode to be shifted to the first storage node during a first interval and to the second terminal during a second terminal. When the operating mode is set as a second mode, the control circuit may not allow the charges integrated in the photodiode to be shifted to the second terminal.

When the operating mode is set as the first mode, the control circuit may simultaneously shift the charges integrated in the photodiode included in the pixels to the first storage node.

The control circuit may perform a first reading operation to sequentially read the charges shifted to the first storage node.

When the operating mode is set as the second mode, the control circuit may sequentially shift the charges integrated in the photodiode comprised in the pixels to the first storage node and/or the second storage node.

When the operating mode is set as the second mode, the control unit may perform, irrespective of an operation of the shift switching unit, the first reading operation to read an amount of charges overflowing into the first storage node from the photodiode and a second reading operation to read an amount of the charges integrated in the photodiode.

The operating mode may be set by a user selection.

The first mode may be a global shutter mode, and the second mode is a WDR mode.

According to another aspect of the present invention, there is provided an imaging device including a pixel and a control circuit to apply a signal to the pixel. The pixel may include a photodiode, a shift switching unit to be disposed at one side of the photodiode, a first storage node to be disposed at one side of the shift switching unit, a transfer switching unit to be disposed at one side of the first storage node, a second storage node to be disposed at one side of the transfer switching unit, and a reset switching unit to be disposed at one side of the second storage node. The control circuit may perform a first reading operation to read an amount of charges stored in the photodiode, a second reading operation to read an amount of charges overflowing into the first storage node from the photodiode and stored in the first storage node, and a third reading operation to read an amount of charges overflowing into the second storage node from the first storage node.

The first reading operation may include reading the amount of the charges by transferring the charges stored in the photodiode to the second storage node through the first storage node.

The second reading operation may include reading the amount of the charges by transferring the charges overflowing into the first storage node from the photodiode and stored in the first storage node to the second storage node.

The second storage node may be a floating diffusion node.

After the photodiode is reset, the control circuit may not turn on the transfer switching unit before the third reading operation is performed.

After the photodiode is reset, the control circuit may not turn on the transfer switching unit before the second reading operation is performed.

The control circuit may perform the second reading operation subsequent to the third reading operation, and perform the first reading operation subsequent to the second reading operation.

A first integration time used for integration of an amount of the charges to be read by the first reading operation may be longer than a second integration time used for integration of an amount of the charges to be read by the second reading operation. Here, the second integration time may be determined within a range between greater than or equal to $1/5000$ of the first integration time and less than or equal to $1/5$ of the first integration time.

The second integration time used for integration of the amount of the charges to be read by the second reading operation may be longer than a third integration time used for integration of an amount of the charges to be read by the third reading. Here, the third integration time may be determined within a range between greater than or equal to $1/5000$ of the second integration time and less than or equal to $1/5$ of the second integration time.

According to still another aspect of the present invention, there is provided an imaging device including a plurality of pixels, a control circuit to apply a signal to the pixels, and a mode selector to select an operating mode between a first mode for a global shutter and a second mode for a WDR. The pixels may include a photodiode, a shift switching unit to be disposed at one side of the photodiode, an overflow control unit to be disposed at another side of the photodiode, a first storage node to be disposed at one side of the shift switching unit, a transfer switching unit to be disposed at one side of the first storage node, a second storage node to be disposed at one side of the transfer switching unit, and a reset switching unit to be disposed at one side of the second charge storage node.

When the first mode is selected, the control circuit may change a potential barrier formed by the overflow control unit based on an interval. When the second mode is selected, the control circuit may maintain the potential barrier formed by the overflow control unit to be high.

When the first mode is selected, the control circuit may maintain the potential barrier of the overflow control unit to be higher than a potential barrier of the shift switching unit during a first interval, and maintain the potential barrier of the overflow control unit to be lower than the potential barrier of the shift switching unit during a second interval. When the second mode is selected, the control circuit may maintain the potential barrier of the overflow control unit to be permanently higher than the potential barrier of the shift switching unit.

The mode selector may select the operating mode between the first mode and the second mode based on at least one of a movement of an object and a dynamic range (DR). Here, the mode selector may determine a degree of the movement of the object based on a difference between at least two images captured successively.

When the difference is greater than a predetermined standard, the mode selector may select the first mode.

The DR may be an intra-scene DR.

The mode selector may determine the DR based on a histogram distribution of at least one captured image. Here, the at least one captured image may refer to an image captured prior to a predetermined amount of time before an image that is desired to be currently captured.

When the DR is greater than a predetermined standard, the mode selector may select the second mode.

When the operating mode is set as the first mode, the control circuit may simultaneously shift the charges integrated in the photodiode included in the pixels to the first storage node.

The control circuit may perform a first reading operation to sequentially read the charges shifted to the first storage node.

When the operating mode is set as the second mode, the control circuit may sequentially shift the charges integrated in the photodiode included in the pixels to the first storage node and/or the second storage node.

When the operating mode is set as the second mode, the control circuit may perform, irrespective of an operation of the shift switching unit, the first reading operation to read an amount of charges overflowing into the first storage node from the photodiode and a second reading operation to read an amount of the charges integrated in the photodiode.

According to yet another aspect of the present invention, there is provided an imaging device including a plurality of pixels and a control circuit to apply a signal to the pixels. The pixels may include a photodiode, a shift switching unit to be disposed at one side of the photodiode, an overflow control unit to be disposed at another side of the photodiode, a first storage node to be disposed at one side of the shift switching unit, a transfer switching unit to be disposed at one side of the first storage node, a second storage node to be disposed at one side of the transfer switching unit, and a reset switching unit to be disposed at one side of the second storage node. The control circuit may control the overflow control unit to selectively perform one between a first operation and a second operation based on a set operating mode. Here, when an operating mode is a first mode, the first operation may include controlling the overflow control unit to prevent charges of the photodiode from overflowing into the first storage node after the charges of the photodiode are shifted to the first storage node. When the operating mode is a second mode, the second operation may include controlling the overflow control unit to store oversaturated charges of the photodiode in the first storage node.

A potential barrier formed by the shift switching unit may be lower than a potential barrier formed by the overflow control unit.

Here, the control circuit may control at least one of the shift switching unit and the overflow control unit to allow the potential barrier formed by the shift switching unit to be lower than the potential barrier formed by the overflow control unit only when the operating mode is set as the second mode.

When the potential barrier of the overflow control unit is higher than the potential barrier of the shift switching unit, charges overflowing from the photodiode may be transferred to the first storage node.

When the operating mode is set as the first mode, the control circuit may simultaneously shift charges integrated in the photodiode included in the pixels to the first storage node.

Here, the control circuit may perform a first reading operation to sequentially read the charges shifted to the first storage node included in the pixels.

Also, the control circuit may perform the first reading operation to sequentially read, by a line, the charges shifted to the first storage node included in the pixels.

When the operating mode is set as the second mode, the control circuit may sequentially shift the charges integrated in the photodiode included in the pixels to the first storage node and/or the second storage node.

When the operating mode is set as the second mode, the control circuit may sequentially shift, by a line, the charges integrated in the photodiode of the pixels to the first storage node and/or the second storage node.

When the operating mode is set as the second mode, the control circuit may perform the first reading operation to read an amount of charges overflowing into the first storage node from the photodiode and integrated in the first storage node and the second reading operation to read an amount of charges integrated in the photodiode.

The operating mode may be determined by a user selection.

The first mode may be a global shutter mode and the second mode may be a WDR mode.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
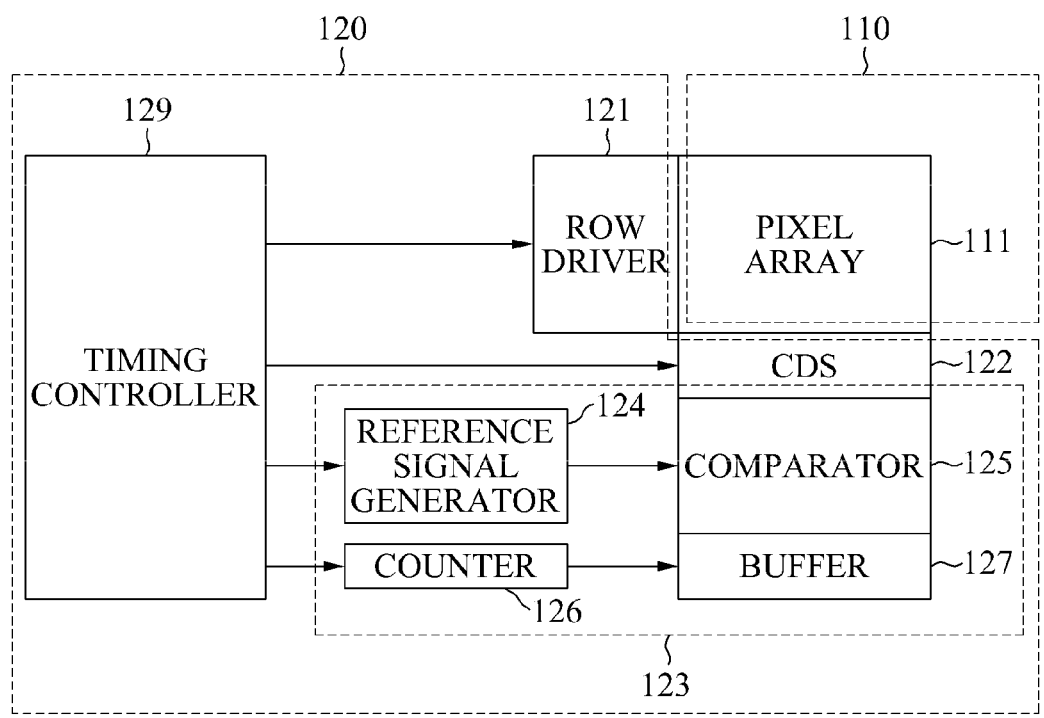
FIG. 1 is a block diagram illustrating a configuration of an imaging device according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying drawings, however, the present invention is not limited thereto or restricted thereby.

When it is determined a detailed description related to a related known function or configuration that may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

1. A Configuration of an Imaging Device

FIG. 1 is a block diagram illustrating a configuration of an imaging device 100 according to an embodiment of the present invention.

Referring to FIG. 1, the imaging device 100 may include a photoelectric conversion unit 110 and a control circuit 120.

The photoelectric conversion unit 110 may convert an incident light to an electrical signal. The photoelectric conversion unit 110 may include a pixel array 111 in which unit pixels are disposed in a form of a matrix. The unit pixels included in the pixel array 111 will be further described hereinafter. The photoelectric conversion unit 110 may further include an infrared filter and/or a color filter.

The control circuit 120 may include a row driver 121, a correlated double sampling (CDS) unit 122, an analog-to-digital converting (ADC) unit 123, and a timing controller 129.

The row driver 121 may be connected to each row of the pixel array 111 and generate a driving signal to drive each row. For example, the row driver 121 may drive the unit pixels included in the pixel array 111 by a row.

The CDS unit 122 may perform correlated double sampling by obtaining a difference between a reference voltage indicating a reset state of the unit pixels and an output voltage indicating a signal component corresponding to an incident light using a capacitor, a switch, and the like, and output an analog sampling signal corresponding to an effective signal component. The CDS unit 122 may include a plurality of CDS circuits connected to respective column lines and output the analog sampling signal corresponding to the effective signal component for each column.

The ADC unit 123 may convert an analog image signal corresponding to the effective signal component to a digital image signal. The ADC unit 123 may include a reference signal generator 124, a comparator 125, a counter 126, and a buffer 127. The reference signal generator 124 may generate a reference signal, for example, a lamp signal having a tilt, and provide the lamp signal to the comparator 125 as the reference signal. The comparator 125 may compare the analog sampling signal output by each column to the lamp signal generated by the reference signal generator 124, and output comparative signals having respective transition points based on the effective signal component. The counter 126 may generate a counting signal by performing a counting operation and provide the counting signal to the buffer 127. The buffer 127 may include latch circuits connected to respective column lines, for example, static random access memories (SRAMs), latch the counting signal output by the counter 126 in response to transition of each comparative signal for each column, and output the latched counting signal as image data.

The ADC unit 123 may further include an adder circuit to add sampling signals output by the CDS unit 122. Also, the buffer 127 may further include single line buffers.

The timing controller 129 may control an operating timing of the row driver 121, the CDS unit 122, and the ADC unit 123. The timing controller 129 may provide a timing signal and a control signal to the row driver 121, the CDS unit 122, and the ADC unit 123.

Figure 2:
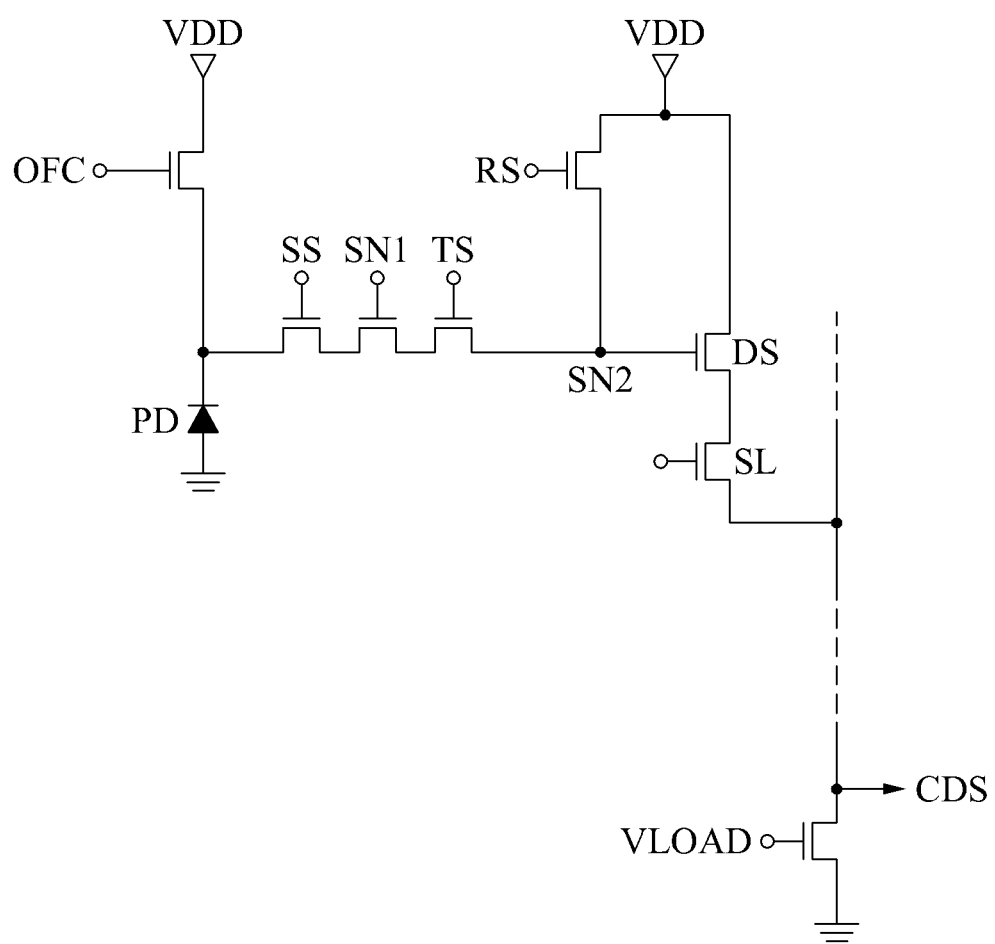
FIG. 2 is a diagram illustrating a circuit of a unit pixel of an imaging device according to an embodiment of the present invention.

FIG. 2 is a diagram illustrating a circuit of a unit pixel of the imaging device 100 according to an embodiment of the present invention.

Referring to FIG. 2, the unit pixel of the imaging device 100 may include a photodiode (PD), an overflow control (OFC) unit, a shift switching (SS) unit, a first storage node (SN1), a transfer switching (TS) unit, a second storage node (SN2), a reset switching (RS) unit, a drive switching (DS) unit, and a selection switching (SL) unit.

The PD may perform photoelectric conversion. The PD may convert incident light to generate electrical charges during a photonic integrated mode. The PD may be provided in a form of one or a combination of a photodiode, a phototransistor, a photogate, and a pinned photodiode (PPD). The PD may include a first terminal and a second terminal.

The OFC unit may be disposed at one side of the PD. The OFC unit may be disposed at the first terminal of the PD. In other words, the OFC unit may be connected to the first terminal of the PD.

The OFC unit may include one terminal to be connected to the PD, another terminal to which a power supply voltage (VDD) is applied, and a gate to which an overflow control signal (OFCx) is applied. When the OFCx is applied to the gate of the OFC unit, charges integrated in the PD may move through the OFC unit.

The SS unit may be disposed at another side of the PD. The SS unit may be disposed at the second terminal of the PD. In other words, the SS unit may be connected to the second terminal of the PD.

A terminal of the SS unit may be connected to the PD. The SS unit may include a gate to which a shift signal (SSx) is applied. When the SSx is applied to the gate of the SS unit, charges integrated in the PD may be shifted to the SN1.

The SN1 may be disposed at one side of the SS unit. The SN1 may include a gate to which a charge storage signal (SN1x) is applied.

The TS unit may be disposed at one side of the SN1. A terminal of the TS unit may be connected to the SN2. The TS unit may include a gate to which a transfer signal (TSx) is applied. When the TSx is applied to the gate of the TS unit, charges stored in the SN1 may be transferred to the SN2. Here, the SN1x applied to the gate of the SN1 may be eliminated so that the charges stored in the SN1 may be smoothly transferred to the SN2.

The SN2 may be provided in a form of a floating diffusion node. The SN2 may receive the charges integrated in the SN1 and accumulate the charges. When the SN1x is eliminated from the gate of the SN1 and the TSx is applied to the gate of the TS unit, the SN2 may accumulate the charges transferred from the SN1 or accumulate charges overflowing from the SN1.

The RS unit may include a first terminal to which a VDD is applied, a second terminal connected to the SN2, and a gate to which a reset signal (RSx) is applied.

The DS unit may include a first terminal to which a VDD is applied, a gate connected to the SN2, and a second terminal.

The SL unit may include a first terminal connected to the second terminal of the DS unit, a gate to which a selection signal (SLx) is applied, and a second terminal to provide an output signal. The other terminal of the SL unit may be connected to the CDS unit of FIG. 1 and a first terminal of a VLOAD switching unit. A second terminal of the VLOAD switching unit may be grounded. A VLOAD signal may be applied to a gate of the VLOAD switching unit.

A method of driving the imaging device 100 will be further described with reference to following figures.

2. A Method of Driving an Imaging Device

According to an embodiment of the present invention, the method of driving the image device 100 may enable the imaging device 100 to operate to selectively obtain a wide dynamic range (WDR) or a global shutter by differently controlling the OFCx applied to the gate of the OFC unit and the SSx applied to the gate of the SS unit based on an operating mode set for the imaging device 100.

According to an embodiment of the present invention, the method of driving the image device 100 may selectively obtain the WDR or the global shutter using an identical pixel array by differently controlling a potential barrier formed by the OFC unit and a potential barrier formed by the SS unit based on a set operating mode.

Figure 3:
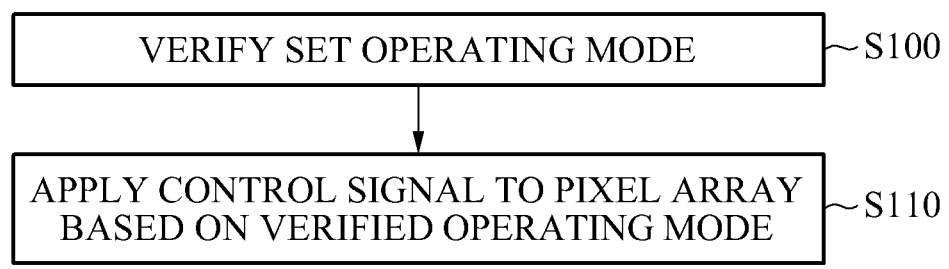
FIG. 3 is a flowchart illustrating a method of driving an image device according to an embodiment of the present invention.

FIG. 3 is a flowchart illustrating the method of driving the image device 100 according to an embodiment of the present invention.

Referring to FIG. 3, the method of driving the imaging device 100 may include verifying the set operating mode in operation 100 and applying a control signal to the pixel array 111 based on the verified operating mode in operation 110. The operating mode may be determined between whether to simultaneously shift charges integrated in the PD of each pixel in the pixel array 111 by an incident light to a charge storage node in each pixel or sequentially shift the charges integrated in the PD of each pixel to the charge storage node in each pixel. For example, the operating mode may relate to whether to convert and read a signal based on a global shutter method or a rolling shutter method in a process of converting/reading an incident light to an electric signal.

Hereinafter, the operating mode for converting/reading the signal based on the global shutter method will be referred to as a first mode. Also, the operating mode for the converting/reading the signal based on the rolling shutter method will be referred to as a second mode. For ease of description, the first mode may be considered a global shutter mode. The second mode may be considered a WDR mode because the imaging device 100 may perform an operation to obtain a WDR in addition to the operation to convert and read the signal based on the rolling shutter method.

The operating mode may be automatically selected and set by the imaging device 100. Also, the operating mode may be selected and set based on an input by a user through an input unit (not shown) included in the imaging device 100.

When the set operating mode is verified in operation 100, the control circuit 120 may apply a control signal to the pixel array 111 based on a result of verifying whether the set operating mode is the first mode or the second mode in operation 110.

When the verified operating mode is the first mode, the control circuit 120 may control each unit pixel to allow charges integrated in the PD to be shifted to the SN1 during a first interval and to the OFC unit during a second interval.

Conversely, when the verified operating mode is the second mode, the control circuit 120 may control each unit pixel to allow the charges integrated in the PD to be shifted to the SN1 and not to be shifted to the OFC unit. Here, oversaturated charges exceeding a capacity of the PD may not be transferred to the OFC unit, but to the SN1.

In the second mode, the control circuit 120 may apply a control signal to allow a potential barrier to be formed by the OFC unit to be higher than a potential barrier to be formed by the SS unit so that the oversaturated charges in the PD may not be transferred to the OFC unit, but to the SN1.

The method of driving the imaging device 100 in the first mode and in the second mode will be further described hereinafter.

2-1. An Operation in a First Mode (a Global Shutter Mode)

Figure 4:
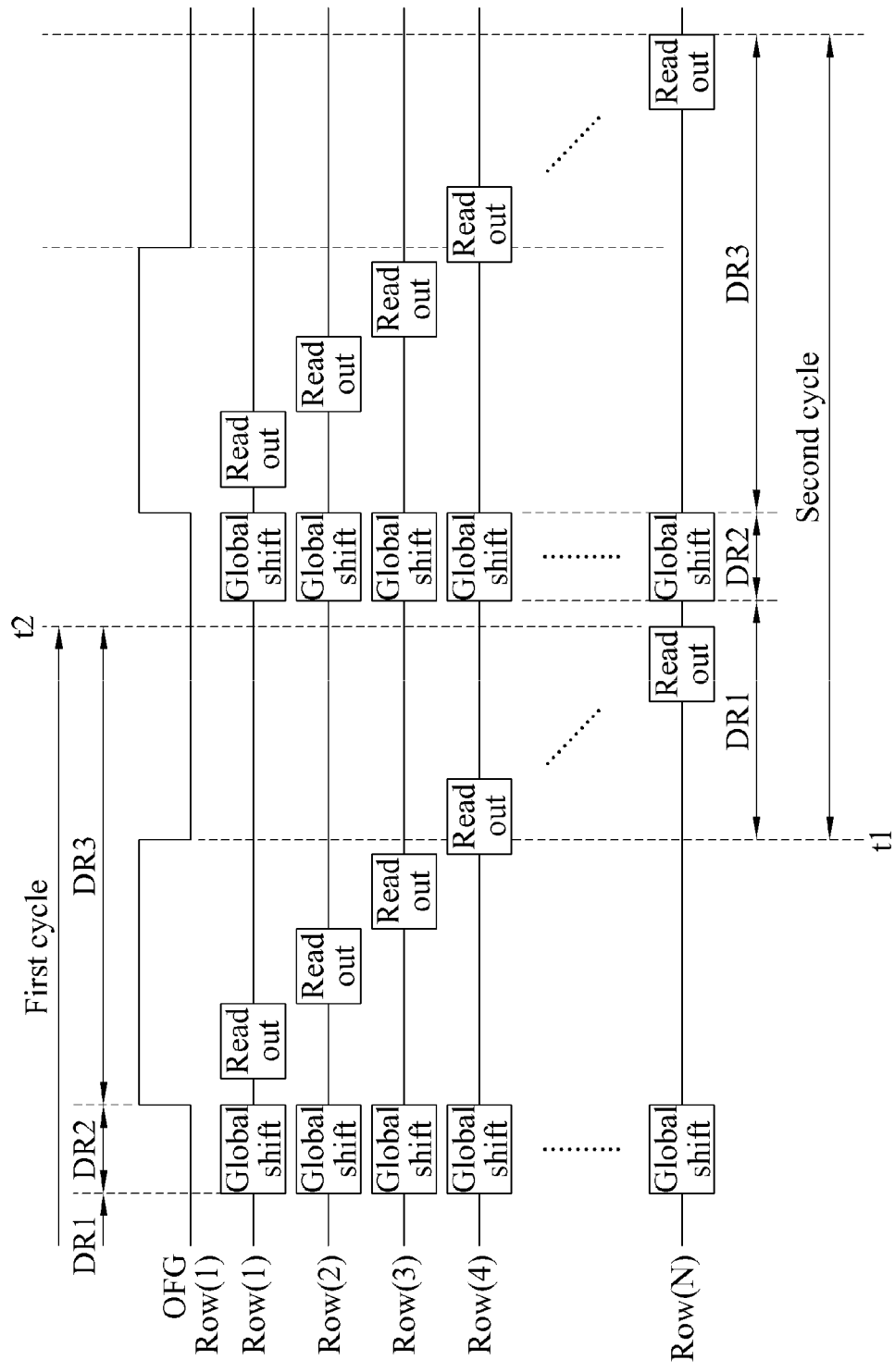
FIG. 4 is a timing diagram illustrating a method of driving a pixel array of an imaging device in a first mode according to an embodiment of the present invention.
Figure 5:
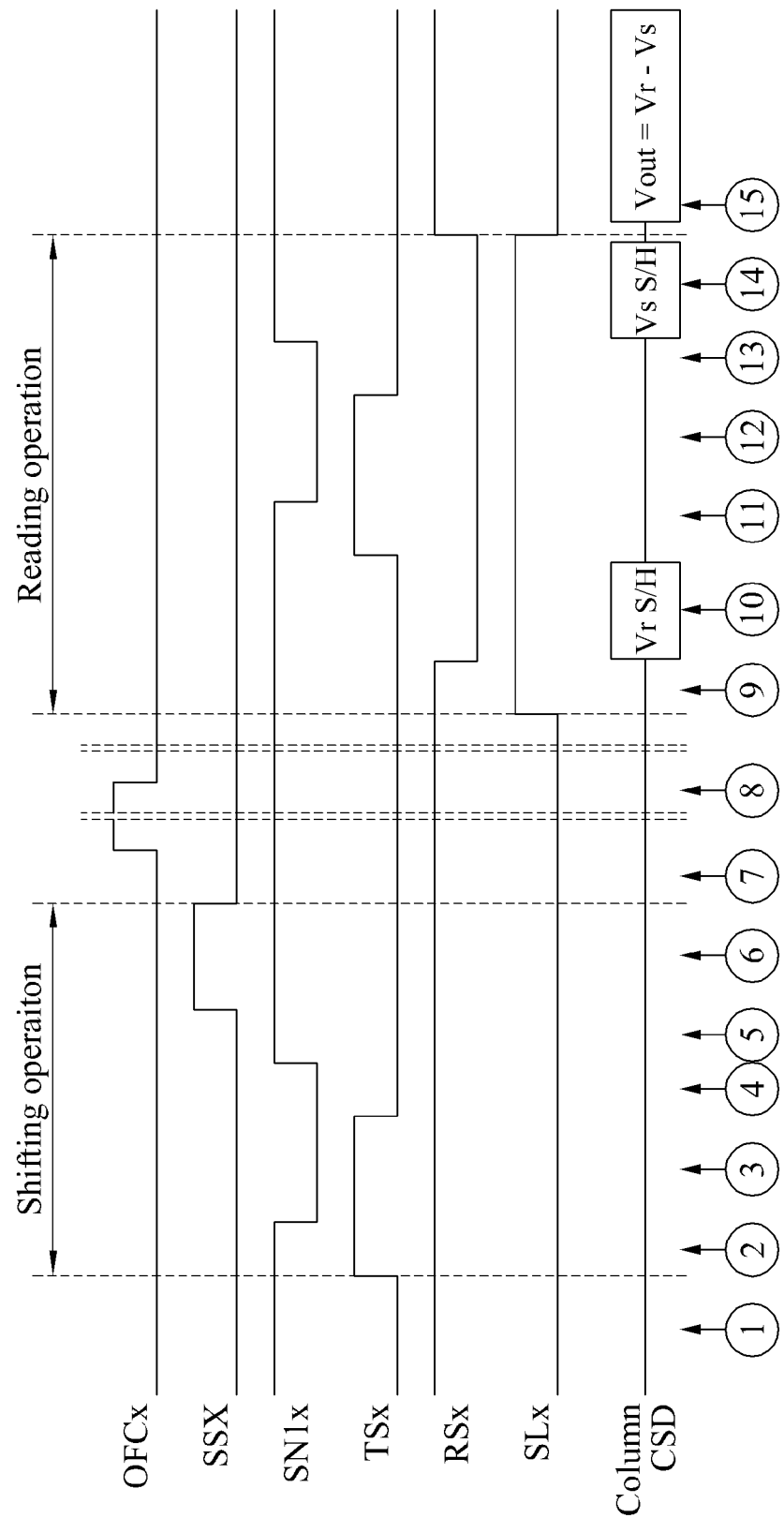
FIG. 5 is a timing diagram of control signals applied to respective components of a unit pixel of an imaging device in a first mode according to an embodiment of the present invention.
Figure 6:
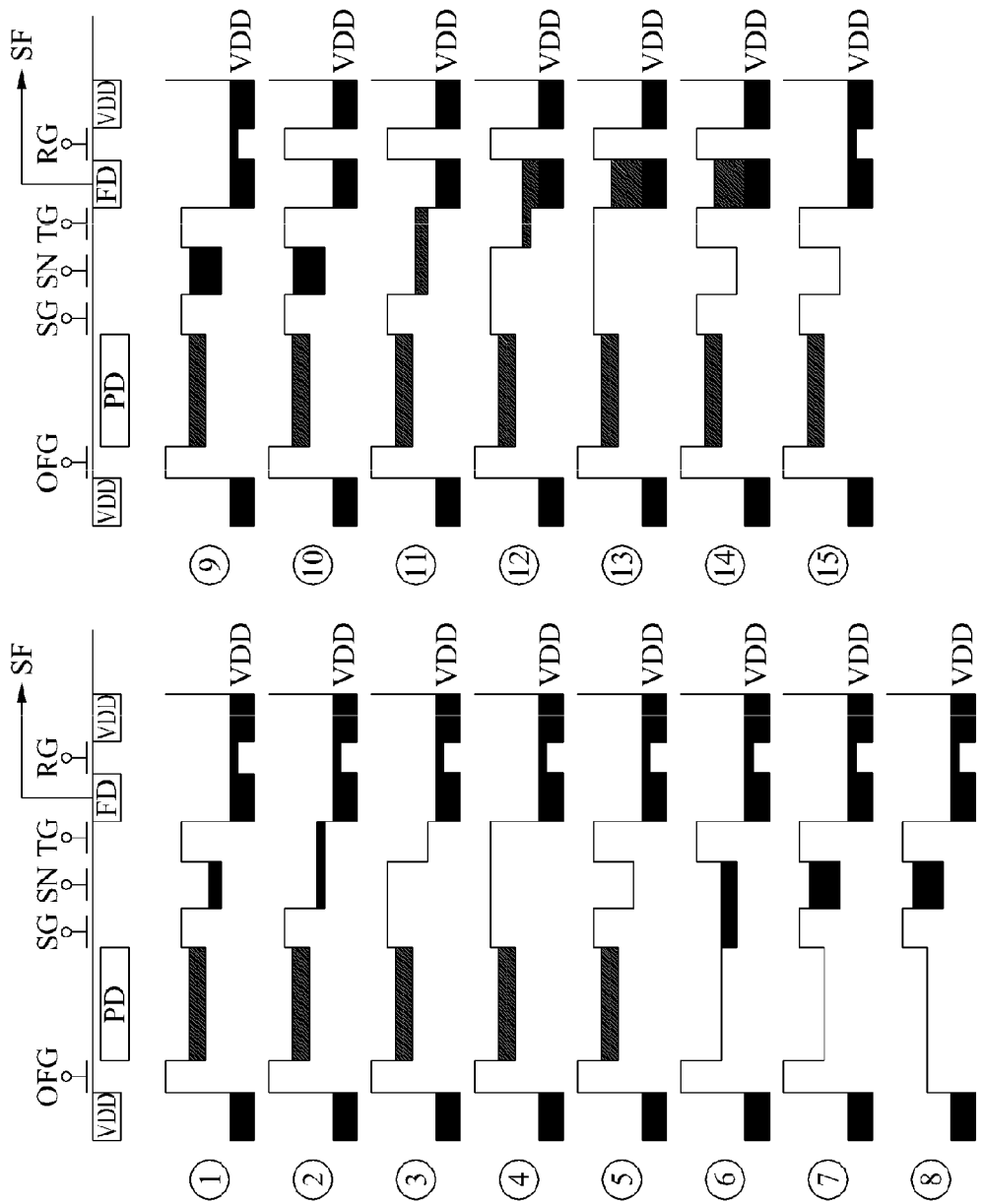
FIG. 6 is a diagram of a potential barrier for illustrating charge transfer in a unit pixel of an imaging device in a first mode according to an embodiment of the present invention.

FIG. 4 is a timing diagram illustrating a method of driving the pixel array 111 of the imaging device 100 in the first mode according to an embodiment of the present invention. FIG. 5 is a timing diagram of control signals applied to respective components of a unit pixel of the imaging device 100 in the first mode according to an embodiment of the present invention. FIG. 6 is a diagram of a potential barrier for illustrating charge transfer in a unit pixel of the imaging device 100 in the first mode according to an embodiment of the present invention.

Referring to FIG. 4, to obtain an image using the imaging device 100, the pixel array 111 may perform an integrating operation in a first duration (DR1), a shifting operation in a second duration (DR2), and a reading operation in a third duration (DR3).

The pixel array 111 may repeatedly perform the integrating operation, the shifting operation, and the reading operation in order. Subsequent to completion of a set of the operations, an image may be obtained.

The integrating operation may include converting an incident light to an electrical charge by the PD. A length of the DR1 may vary as a need arises.

The integrating operation may be simultaneously performed on all effective pixels included in the pixel array 111.

The shifting operation may include shifting charges integrated in the PD to the SN1. Also, the shifting operation may include a cleaning operation to eliminate charges already integrated in the SN1, for example, charges integrated unnecessarily in the SN1. The cleaning operation will be further described hereinafter.

As illustrated in FIG. 4, the shifting operation may be simultaneously performed on all the effective pixels included in the pixel array 111. Although simultaneously performing the cleaning operation on all the effective pixels may not be necessary, it may be preferable.

During the integrating operation and the shifting operation, the OFC unit may not allow the charges integrated in the PD to be transferred to the OFC unit. To this end, the OFC unit may maintain a high potential barrier. For example, when the OFC unit is provided in a form of a transistor, the transistor may maintain an off state.

The reading operation may include transferring the charges shifted from the PD to the SN1 and integrated in the SN1 to the SN2, and reading a value of an amount of the charges transferred to and integrated in the SN2.

Although the reading operation may be simultaneously performed on all the effective pixels included in the pixel array 111, a method of sequentially reading the effective pixels by a line may be adopted. For example, as illustrated in FIG. 4, the reading operation may be performed on pixels arranged in an identical row during an identical period of time, and on pixels arranged in different rows during different periods of time.

Here, the SN2 may be a floating diffusion node and thus, a potential barrier of the SN2 may not be actively changed.

A first cycle and a second cycle including the integrating operation, the shifting operation, and the reading operation may overlap. A first point in time (t1) at which the first cycle is terminated may be later than a second point in time (t2) at which the second cycle is initiated. Thus, the reading operation included in the first cycle may overlap with the integrating operation included in the second cycle.

The integrating operation, the shifting operation, and the reading operation of a unit pixel will be further described with reference to FIGS. 5 and 6.

Referring to FIGS. 5 and 6, interval (1) may correspond to the integrating operation, intervals (2) through (6) may correspond to the shifting operation, and intervals (7) through (14) may correspond to the reading operation.

Referring to FIG. 6, in interval (1), the OFC unit and the SS unit may be controlled to allow respective potential barriers formed by the OFC unit and the SS unit to be maintained to be high. That is, the potential barriers formed by the OFC unit and the SS unit may be maintained to be higher than the PD. For example, as illustrated in FIG. 5, when the OFC unit and the SS unit are provided in a form of a transistor, a control signal, for example, an OFCx and an SSx, may not be applied to the gate of the OFC unit and the gate of the SS unit. Although FIGS. 5 and 6 illustrate an example in which an SN1x and an RSx are applied respectively to the gate of the SN1 and the gate of the RS unit and a TSx is not applied to the TS unit, the control signals to be applied to the SN1, the TS unit, and the RS unit and the potential barriers formed by the control signals in interval (1) may not need to be controlled as illustrated in FIGS. 5 and 6. However, for ease of description, the example in which the control signals are applied as illustrated in FIGS. 5 and 6 will be described herein.

Intervals (2) through (5) may correspond to the cleaning operation. In intervals (2) through (5), charges unnecessarily integrated in the SN1 may be eliminated to more precisely read a value of charges integrated in the PD.

To perform the cleaning operation, in interval (2), the TS unit may be controlled while a state of the SS unit is being maintained to change a potential barrier formed by the TS unit to be low. For example, the TSx may be applied to the TS unit. Here, the TS unit may be controlled to allow the potential barrier of the TS unit to be less than or equal to a potential barrier of the SN1. Accordingly, the charges unnecessarily integrated in the SN1 may be transferred to the TS unit. Here, the SN2 may maintain a reset state and thus, the charges transferred to the TS unit may all be reset. Accordingly, the charges unnecessarily integrated in the SN1 may be eliminated. For more desirable elimination of the charges unnecessarily integrated in the SN1, operations in intervals (3) and (4) may be further performed. The potential barrier of the SN1 and the potential barrier of the TS unit may be sequentially changed to be high. For example, the control signals, for example, the SN1x and the TSx applied to the gate of the SN1 and the gate of the TS unit, may be eliminated. Accordingly, the charges unnecessarily integrated in the SN1 may be transferred to the SN2 that may maintain the reset state more firmly and thus, eliminated. In interval (5), the SN1 and the TS unit may be controlled to allow the potential barriers of the SS unit and the TS unit to be maintained to be higher than the potential barrier of the SN1. Accordingly, the SN1 may be prepared to receive the charges integrated in the PD.

When the cleaning operation is completed as described in the foregoing, an operation in interval (6) may be performed to shift the charges integrated in the PD to the SN1. To this end, the SS unit may be controlled to allow the potential barrier of the SS unit to be lower than the potential barrier of the PD. For example, an SSx may be applied to the gate of the SS unit.

After the charges integrated in the PD are shifted to the SN1, the SS unit may be controlled to change the potential barrier of the SS unit to be high to prevent the charges shifted to the SN1 in interval (7) from flowing backward to the PD. For example, the SSx applied to the SS unit may be eliminated.

In interval (8), charges may be continuously integrated in the PD due to incident light. Here, the OFC unit may be appropriately controlled to prevent a possibility of the integrated charges overflowing into the SN1. The OFC unit may be controlled to allow the potential barrier of the OFC unit to be lower than the potential barrier of the SS unit. Thus, the charges to be integrated in the PD may overflow into the OFC unit. However, the PD may need to perform the integrating operation again to obtain a subsequent image and charges unnecessarily integrated in the PD may need to be eliminated. Accordingly, it may be desirable to control the OFC unit to allow the potential barrier of the OFC unit to be less than or equal to the potential barrier of the PD.

In interval (9), the potential barrier of the OFC unit may be changed to be high again. The charges to be integrated in the PD subsequent to interval (9) may be used to obtain a subsequent image. As described with reference to FIG. 4, the reading operation included in the first cycle and the integrating operation included in the second cycle may overlap.

However, a sequential relationship between a timing at which the integrating operation in the second cycle is started by changing the potential barrier of the OFC unit to be high again in interval (9) and operations to be performed in intervals (10) through (15) to be described hereinafter may not be limited to the descriptions provided with reference to FIGS. 5 and 6. According to an embodiment of the present invention, although the shifting operation may be simultaneously performed on all effective pixels included in the pixel array 111 in the first mode, the reading operation may be performed on pixels included in the pixel array 111 at different timings. Accordingly, the sequential relationship between the integrating operation in the second cycle and the reading operation in the first cycle may be applied to a single unit pixel as illustrated in FIGS. 5 and 6. However, in another unit pixel, the integrating operation, for example, changing the potential barrier of the OFC unit to be high, in the second cycle may be started at a timing between intervals (10) and (11). Also, in still another unit pixel, the integrating operation in the second cycle may be performed at a timing between intervals (11) and (12).

In interval (10), the RS unit may be controlled to change the potential barrier of the RS unit to be high. Subsequently, a first output signal may be generated by sampling an electrical potential of the SN2.

In interval (10), the SL unit may be changed to be an on state. For example, an SLx may be applied to the gate of the SL unit. A state of the SL unit changed to be the on state in interval (10) may be maintained until interval (14).

During intervals (11) through (13), the charges integrated in the SN1 may be transferred to the SN2. In interval (11), the potential barrier of the TS unit may be changed to be low to allow the charges integrated in the SN1 to be transferred to the SN2. For example, the TSx may be applied to the gate of the TS unit. For more desirable transfer of the charges integrated in the SN1 to the SN2, operations in intervals (12) and (13) may be further performed. The potential barrier of the SN1 and the potential barrier of the TS unit may be sequentially changed to be high. For example, the control signals, for example, the SN1x and the TSx applied to the respective gates of the SN1 and the TS unit, may be eliminated. Accordingly, the charges integrated in the SN1 may be transferred to the SN2 more precisely. Here, the potential barrier of the RS unit may be continuously maintained to be high during intervals (11) through (13) and thus, the charges integrated in the SN1 may be transferred to the SN2 and integrated in the SN2. Dissimilar to the operations during intervals (2) through (4), the charges transferred from the SN1 to the SN2 may be integrated in the SN2 without escaping to the first terminal of the RS unit to which a VDD is being applied because the SN2 is not in the reset state.

In interval (14), a second output signal may be generated by sampling an electrical potential of the SN2.

Here, an amount of the charges integrated in the PD by incident light may be determined based on a difference between the first output signal and the second output signal.

In interval (14), the state of the SL unit may be changed to be an off state after the second output signal is generated by sampling the electrical potential of the SN2.

Each unit pixel may repeatedly perform the operations described in the foregoing. More particularly, subsequent to the operation of interval (14), each pixel may repeatedly perform the operations of intervals (1) through (14) when the reading operation is completed on all effective pixels included in the pixel array 111 after waiting for all the effective pixels in the pixel array 111 to complete the operation of interval (14) or waiting for the reading operation to be completed on all the effective pixels.

According to an embodiment of the present invention, when the operating mode is set as the first mode, the potential barrier of the OFC unit may be changed to be low in a particular interval, for example, interval (8) as illustrated in FIG. 6. The low potential barrier of the OFC unit may be maintained until the integrating operation in a subsequent cycle is performed. However, the potential barrier of the OFC unit may need to be changed to be high again for the integrating operation to be performed and thus, changing the potential barrier of the OFC unit to be high before the integrating operation is performed may be preferable.

2-2. An Operation in a Second Mode (a WDR Mode)

Figure 7:
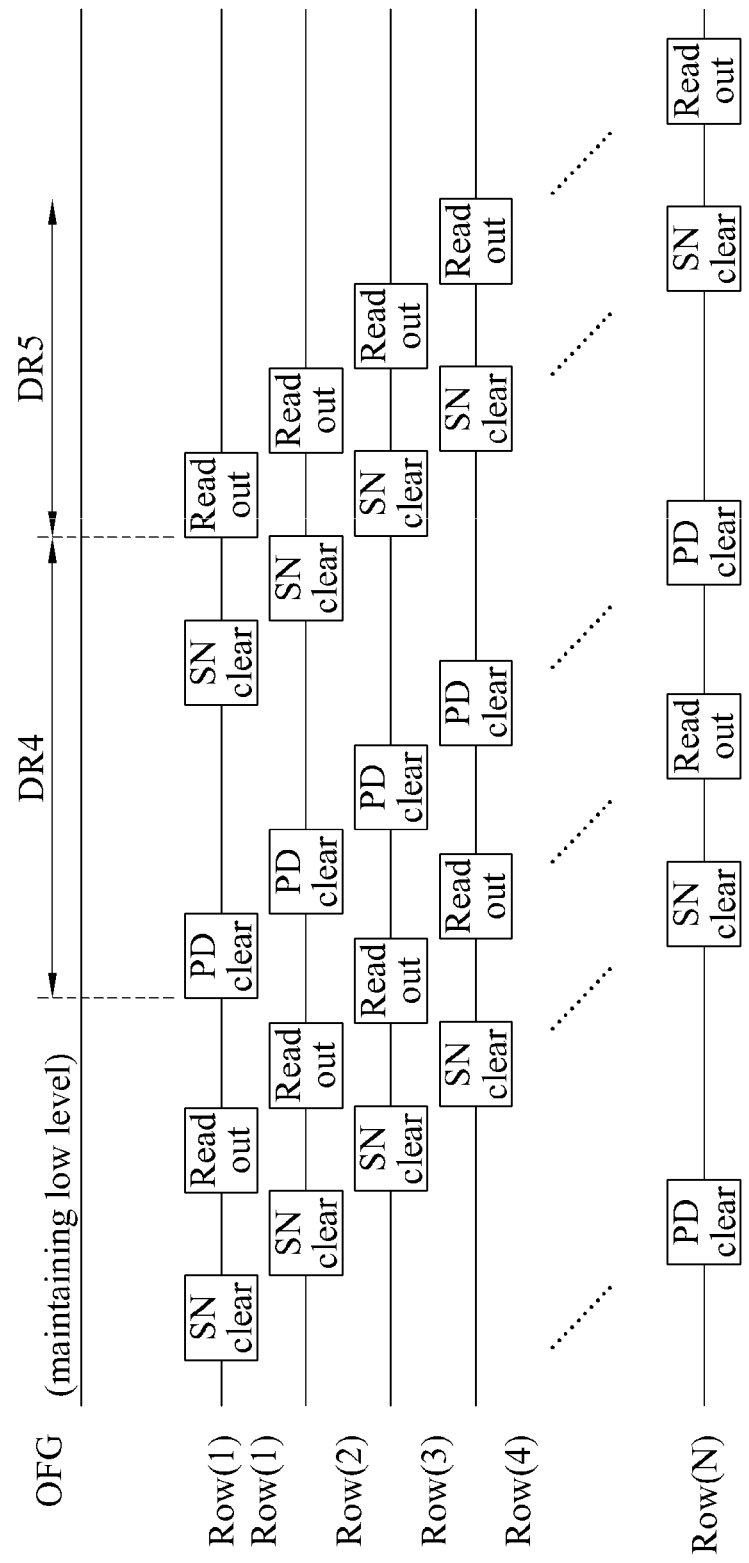
FIG. 7 is a timing diagram illustrating a method of driving a pixel array of an imaging device in a second mode according to an embodiment of the present invention.
Figure 8:
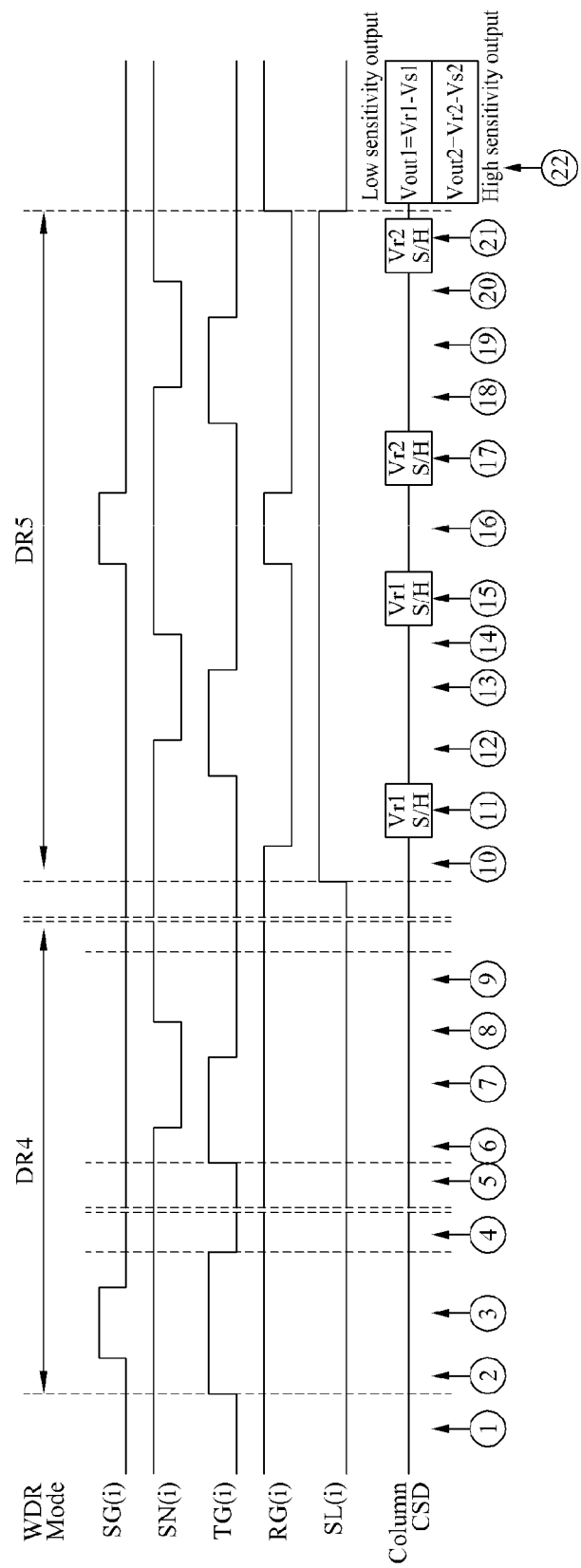
FIG. 8 is a timing diagram of control signals applied to respective components of a unit pixel of an imaging device in a second mode according to an embodiment of the present invention.
Figure 9:
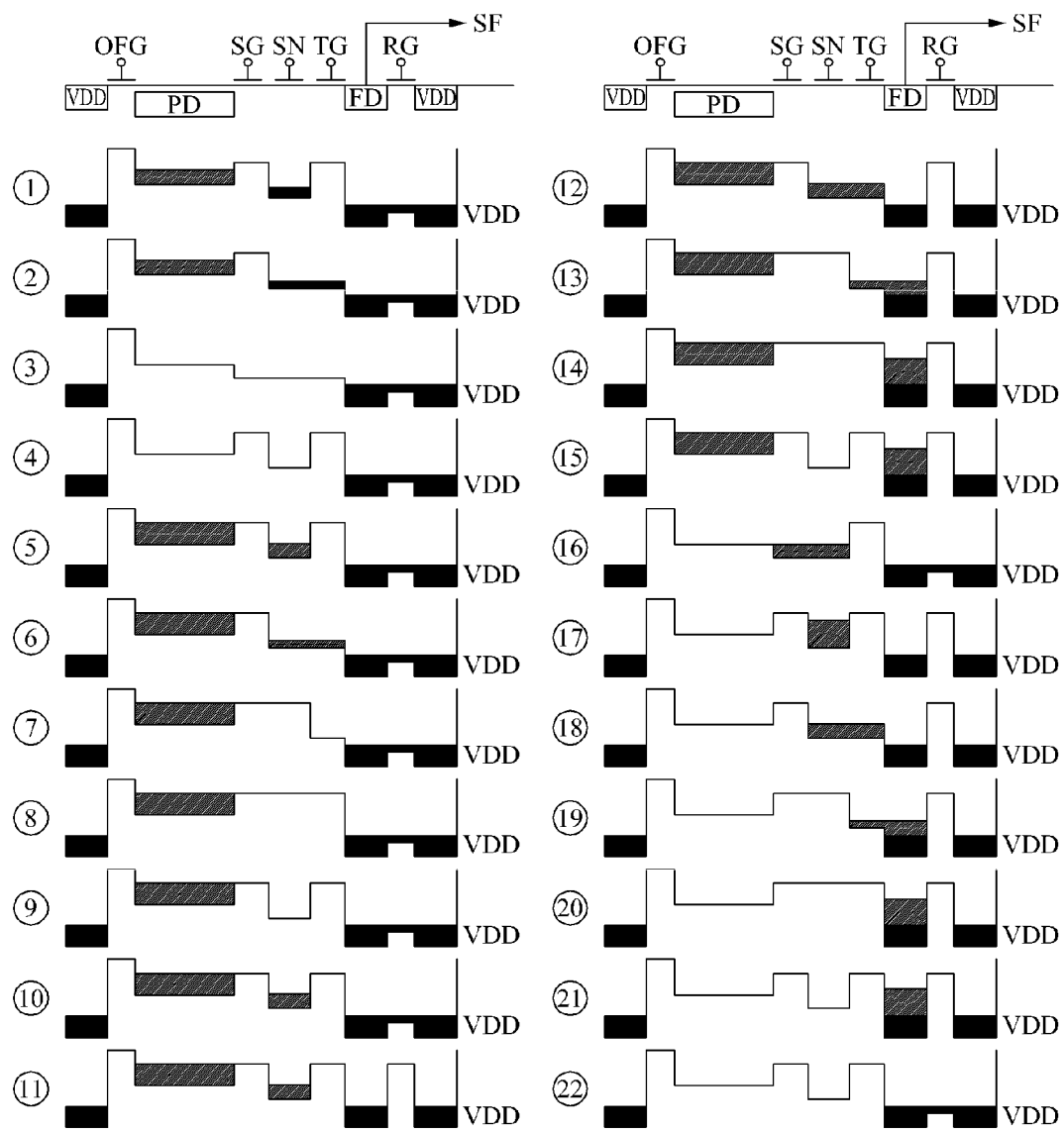
FIG. 9 is a diagram of a potential barrier for illustrating charge transfer in a unit pixel of an imaging device in a second mode according to an embodiment of the present invention.

FIG. 7 is a timing diagram illustrating a method of driving the pixel array 111 of the imaging device 100 in a second mode according to an embodiment of the present invention. FIG. 8 is a timing diagram of control signals applied to respective components of a unit pixel of the imaging device 100 in a second mode according to an embodiment of the present invention. FIG. 9 is a diagram of a potential barrier for illustrating charge transfer in a unit pixel of the imaging device 100 in a second mode according to an embodiment of the present invention.

Referring to FIG. 7, to obtain an image using the imaging device 100, the pixel array 111 may perform the integrating operation in a fourth duration (DR4) and the reading operation in a fifth duration (DR5).

The pixel array 111 may repeatedly perform the integrating operation and the reading operation in order. Subsequent to completion of a set of the operations, an image may be obtained.

Dissimilar to the first mode, the integrating operation and the reading operation may not be simultaneously performed on all effective pixels in the second mode. As illustrated in FIG. 8, the integrating operation and the reading operation may be simultaneously performed on effective pixels included in an identical column. However, the integrating operation and the reading operation may be performed on effective pixels included in different columns at different timings. Accordingly, a sequential reading method based on a line, in lieu of the simultaneous performance on all effective pixels, may be adopted.

The integrating operation may include converting incident light to an electrical charge by the PD. Also, the integrating operation may include a cleaning operation performed on the PD and/or the SN1 (hereinafter referred to as a first cleaning operation) and a cleaning operation performed on the SN1 (hereinafter referred to as a second cleaning operation). The integrating operation will be further described hereinafter.

The reading operation may include a first reading operation to read at least a portion of charges overflowing into the SN1 from the PD and a second reading operation to read an amount of charges integrated in the PD.

A value of the amount of the charges read by the first reading operation may be used to obtain a high-luminance image, and a value of the amount of the charges read by the second reading operation may be used to a low-luminance image. Here, the first reading operation may be performed prior to the second reading operation.

An amount of time used for integration of charges to be read by the first reading operation (hereinafter referred to as a first integration time [T1]) may be less than an amount of time used for integration of charges to be read by the second reading operation (hereinafter referred to as a second integration time [T2]). For example, the T1 and the T2 may have a following relationship.

$$1/5000 \leq T1/T2 \leq 1/5$$

During the integrating operation and the reading operation, the OFC unit may not allow the charges integrated in the PD to be transferred to the OFC unit. In the first mode, the OFC unit may be controlled to selectively transfer the charges integrated in the PD to the OFC unit in a particular interval. In the second mode, the OFC unit may be controlled to prevent the charges from transferring to the OFC unit in all intervals. To this end, the OFC unit may maintain a high potential barrier. For example, when the OFC unit is provided in a form of a transistor, the transistor may maintain an off state. Here, maintaining the potential barrier of the OFC unit to be higher than a potential barrier of the SS unit may be preferable.

The integrating operation and the reading operation in each unit pixel will be further described with reference to FIGS. 8 and 9.

Referring to FIGS. 8 and 9, intervals (1) through (9) may correspond to the integrating operation, and intervals (10) through (22) may correspond to the reading operation. Here, intervals (1) through (3) may correspond to the first cleaning operation to clean the PD, and intervals (6) through (9) may correspond to the second cleaning operation to clean the SN1. Also, intervals (10) through (15) may correspond to the first reading operation, and intervals (16) through (21) may correspond to the second reading operation.

As illustrated in FIG. 9, in interval (1), unnecessary charges may be integrated in the PD and the SN1 after the reading operation is completed in a previous cycle. To obtain precise information on incident light, each unit pixel may need to clean the charges unnecessarily integrated in the PD before the integrating operation is performed based on the incident light.

During intervals (2) through (4), the first cleaning operation may be performed. In interval (2), a potential barrier of the TS unit may be controlled to eliminate the charges unnecessarily integrated in the SN1. The TS unit may be controlled to allow the potential barrier of the TS unit to be less than or equal to a potential barrier of the SN1. For example, a TSx may be applied to the gate of the TS unit. Accordingly, the charges unnecessarily integrated in the SN1 may escape to the first terminal of the RS unit to which a VDD is applied through the SN2 maintaining a reset state. In interval (3), a potential barrier of the SS unit may be controlled to eliminate the charges unnecessarily integrated in the PD. The SS unit may be controlled to allow the potential barrier of the SS unit to be less than or equal to a potential barrier of the PD. For example, an SSx may be applied to the gate of the SS unit. Accordingly, the charges unnecessarily integrated in the PD may be shifted to the SN1. The charges shifted to the SN1 may escape to the first terminal of the RS unit to which the VDD is applied through the SN2 maintaining the reset state because the potential barrier of the TS unit controlled in interval (2) continuously maintains a low state, for example, a state in which the TSx is applied.

After the charges unnecessarily integrated in the PD and/or the SN1 are eliminated through interval (4), the potential barrier of the SS unit may be changed to be high again. The SS unit may be controlled to allow the potential barrier of the SS unit to be higher than the potential barrier of the PD and/or the SN1. For example, the SSx applied to the gate of the SS unit may be eliminated. Also, the potential barrier of the TS unit may be changed to be high again. For example, the TSx applied to the gate of the TS unit may be eliminated. When the changed potential barrier of the SN1 is high, the potential barrier of the SN1 may be changed to be low again. For example, an SN1x may be applied to the gate of the SN1. Thus, all preparations for storing charges generated by incident light in the PD and/or the SN1 may be completed. In interval (4), the potential barriers of the SS unit, the SN1, and the TS unit may not need to be changed simultaneously, but changed sequentially.

As described in the foregoing, the charges unnecessarily integrated in the PD and/or the SN1 may be eliminated. However, an order of the operations described in intervals (2) through (4) is provided as an illustrative example to describe the first cleaning operation and thus, the first cleaning operation may not be limited to the operations in intervals (2) through (4). Although the foregoing description provides the order of controlling the potential barrier of the TS unit first and controlling the potential barrier of the SS unit subsequently, the first cleaning operation may be performed based on the order of controlling the potential barrier of the SS unit first and controlling the potential barrier of the TS unit subsequently. Alternatively, the first cleaning operation may be performed by simultaneously controlling the potential barrier of the SS unit and the potential barrier of the TS unit. Although the potential barrier of the SN1 is illustrated to be permanently low during intervals (2) through (4), the potential barrier of the SN1 may be changed to be high and to be low again during the first cleaning operation.

Through interval (5), the PD may integrate charges generated by incident light. Here, the potential barrier of the SS unit may be maintained to be high, although the SS unit and the OFC unit may be controlled to allow the potential barrier of the SS unit to be lower than the potential barrier of the OFC unit. Thus, a capacity of the PD may be determined by the potential barrier of the SS unit in lieu of the potential barrier of the OFC unit.

In general, an amount of charges to be integrated in the PD may vary based on an amount of light incident to the PD. For example, the greater the amount of incident light increases, the greater the amount of the charges to be integrated in the PD. Conversely, the lower the amount of incident light, the lower the amount of the charges to be integrated in the PD. When the amount of the charges to be integrated in the PD is greater than the capacity of the PD, charges generated from the PD and exceeding the capacity of the PD may overflow. The charges exceeding the capacity of the PD and overflowing will be hereinafter referred to as overflow charges.

According to an embodiment of the present invention, the OFC unit and/or the SS unit may be controlled to allow the potential barrier of the SS unit to be lower than the potential barrier of the OFC unit and thus, the overflow charges of the PD may overflow into the SS unit. In interval (5) as illustrated in FIG. 9, the overflow charges of the PD may overflow into the SN1. However, when charges generated from the PD are less than the capacity of the PD in interval (5), the charges may not overflow into the SN1.

In general, overflow charges of a photodiode may not be used to form an image, and may be eliminated. However, according to an embodiment of the present invention, at least a portion of the overflow charges of the PD may be used to form an image.

In intervals (6) and (7), the second cleaning operation may be performed to eliminate a portion of the charges overflowing from the PD and integrated in the SN1. In interval (6), the potential barrier of the TS unit may be controlled to eliminate the charges integrated in the SN1. The potential barrier of the TS unit may be controlled to be less than or equal to the potential barrier of the SN1. Accordingly, the charges integrated in the SN1 may escape to the first terminal of the RS unit to which a VDD is applied through the SN2 maintaining the reset state. Here, the potential barrier of the SN1 may be further changed to be high to ensure elimination of the charges integrated in the SN1. In interval (7) as illustrated in FIG. 9, the potential barrier of the SN1 may be changed to be high. For example, the SN1x applied to the gate of the SN1 may be eliminated.

During intervals (8) and (9), the SN1 may be prepared for reintegration of the charges overflowing from the PD. The potential barrier of the TS unit may be changed to be high again and the potential barrier of the SN1 may be changed to be low again.

Here, the operations of intervals (6) through (9) may be performed to use a portion, rather than all, of the charges overflowing form the PD and thus, the operations may not be necessarily performed by a method applied to intervals (6) through (9) illustrated in FIG. 9. FIG. 9 illustrates an example in which the potential barrier of the TS unit is changed and maintained to be high throughout intervals (4) and (5) and the potential barrier of the TS unit is changed to be low in interval (6) to eliminate a portion of the overflow charges that may not be required to form a high-luminance image. However, although the potential barrier of the TS unit may be controlled to be continuously low throughout intervals (4) and (5), a portion of unnecessary overflow charges may escape to the first terminal of the RS unit and an effect of the cleaning operation may be achieved.

In intervals (6) through (9), operations may be performed to use a portion, rather than all, of the charges overflowing from the PD. When all the charges overflowing from the PD are to be used, the operations of intervals (6) through (9) may be omitted.

In interval (10), charges to be read by the first reading operation may be integrated in the SN1. Through interval (10), the charges overflowing into the SN1 from the PD may be integrated in the SN1.

An amount of time during which the operation of interval (10) is performed may be determined based on the T1, which may indicate a period of time used for integration of the charges to be read by the first reading operation. The amount of time during which the operation of interval (10) is performed may not correspond to the T1. The T1 may include a portion of a period of time during which an operation of interval (11) and/or interval (12) to be described hereinafter is performed.

During intervals (11) through (15), the first reading operation may be performed. The charges overflowing into the SN1 from the PD and integrated in the SN1 may be transferred to the SN2 by a series of operations, and the first reading operation may be performed by reading an amount of charges transferred to the SN2. The first reading operation performed throughout intervals (11) through (15) may be identical or similar to the operations performed during intervals (11) through (14) described with reference to FIG. 6.

In interval (11), the RS unit may be controlled to change the potential barrier of the RS unit to be high. Accordingly, a third output signal may be generated by sampling an electrical potential of the SN2. Also, throughout intervals (12) through (14), the charges integrated in the SN1 may be transferred to the SN2. In interval (15), a fourth output signal may be generated by sampling an electrical potential of the SN2. Here, an amount of the charges overflowing into the SN1 from the PD and integrated in the SN1 (hereinafter referred to as an amount of overflow charges) due to incident light may be determined based on a difference between the first output signal and the second output signal. A method of controlling the TS unit, the SN1, and the RS unit to obtain the amount of the overflow charges throughout intervals (11) through (15) may be identical or similar to a method applied in intervals (10) through (14) illustrated in FIG. 6. Thus, a repeated or detailed description will be omitted here for brevity.

According to an embodiment of the present invention, the amount of the overflow charges obtained by the first reading operation may be used to obtain a high-luminance image and accordingly, the WDR may be achieved.

Although the T1 used for integration of the amount of the overflow charges to be read by the first reading operation may have a constant value, the value may depend on a result of analyzing at least one already obtained image and receiving feedback in real time or periodically. For example, when a luminance is determined to be very high as a result of the analyzing the at least one already obtained image, or the luminance is greater than or equal to a predetermined first luminance threshold, the T1 may be shorter than the T1 used to obtain a previous image. Conversely, when the luminance is not determined to be very high as a result of the analyzing the at least one already obtained image, or the luminance is less than or equal to a predetermined second luminance threshold, the T1 may be longer than the T1 used to obtain the previous image.

Although the T1 may be identically applied to all effective pixels included in the pixel array 111, the T1 may be differently set for each effective pixel. For example, a luminance distribution for each effective pixel may be verified by analyzing the at least one already obtained image and thus, the T1 to be applied to each pixel may be differently set based on the luminance distribution for each effective pixel.

The T1 relates closely to expansion of a DR to be achieved in the second operating mode according to an embodiment of the present invention and thus, the T1 may be controlled by applying various methods that may not be limited to the foregoing descriptions.

During intervals (16) through (22), the second reading operation may be performed. Charges generated by the PD due to incident light and integrated in the PD may be transferred to the SN2 through the SN1. The second reading operation may be performed by reading an amount of the charges transferred to the SN2. The second reading operation performed throughout intervals (16) through (22) may be identical or similar to the operations performed in intervals (6) and (7), and (9) through (13) illustrated in FIG. 6.

During intervals (16) and (17), the charges integrated in the PD may be shifted to the SN1. Here, the charges integrated in the SN2 may be eliminated for the first reading operation. The potential barrier of the RS unit may be controlled to be, for example, low and the charges integrated in the SN2 may escape to the first terminal of the RS unit to which a VDD is applied. In interval (17), the RS unit may be controlled to change the potential barrier of the RS unit to be high. Accordingly, a fifth output signal may be generated by sampling an electrical potential of the SN2. Throughout intervals (18) through (20), the charges integrated in the SN1 may be transferred to the SN2. In interval (21), a sixth output signal may be generated by sampling an electrical potential of the SN2. Here, an amount of the charges generated due to the incident light and integrated in the PD (hereinafter referred to as an amount of PD charges) may be determined based on a difference between the fifth output signal and the sixth output signal. In interval (22), the charges integrated in the SN2 may be reset.

A method of controlling the SS unit, the TS unit, the SN1, and the RS unit to obtain the amount of the PD charges may be identical or similar to the method in intervals (6) and (7) and (9) through (13) illustrated in FIG. 6 and thus, a repeated and detailed descriptions will be omitted here for brevity.

According to an embodiment of the present invention, the amount of the PD charges obtained by the second reading operation may be used to obtain a low-luminance image and accordingly, the WDR may be achieved.

Although the T2 used for integration of the amount of the charges to be read by the second reading operation may have a constant value, the value may depend on a result of analyzing at least one already obtained image and receiving feedback in real time or periodically. For example, when a luminance is determined to be very low as a result of analyzing the at least one already obtained image, or the luminance is less than or equal to a predetermined third luminance threshold, the T2 may be longer than the T2 used to obtain a previous image. Conversely, when the luminance is not determined to be very low as a result of the analyzing the at least one already obtained image, or the luminance is greater than or equal to a predetermined fourth luminance threshold, the T2 may be shorter than the T2 used to obtain the previous image.

Although the T2 may be identically applied to all effective pixels included in the pixel array 111, the T2 may be differently set for each effective pixel. For example, a luminance distribution for each effective pixel may be verified by analyzing the at least one already obtained image and thus, the T2 to be applied to each pixel may be differently set based on the luminance distribution for each effective pixel.

The T2 relates closely to expansion of the DR to be achieved in the second operating mode according to an embodiment of the present invention and thus, the T2 may be controlled by applying various methods that may not be limited to the foregoing descriptions.

Each unit pixel may repeatedly perform the operations described in the foregoing. More particularly, each unit pixel may re-perform the operations of intervals (1) through (22) subsequent to completion of the operations performed in intervals (1) through (22).

According to an embodiment of the present invention, when the operating mode of the imaging device 100 is set as the second mode, the potential barrier of the OFC unit may be maintained to be high in all intervals. The potential barrier of the OFC unit may be maintained to be higher than the potential barrier of the SS unit because the charges overflowing from the PD may be used to obtain an image in the second mode and all the charges overflowing from the PD may need to be transferred to the SN1 without overflowing into the OFC unit.

Although, for ease of description, the potential barrier of the OFC unit may need to be maintained to be permanently high in all intervals or to be higher than the potential barrier of the SS unit, the potential barrier of the OFC unit may be changed to be lower than or equal to the potential barrier of the SS unit and changed to be high again without departing from a scope of the present invention. For example, the charges overflowing from the PD may not all be used to obtain an image as illustrated in intervals (5) through (9) of FIG. 9, the potential barrier of the OFC unit may be controlled to be lower than or equal to the potential barrier of the SS unit in the intervals.

Although, for ease of description, the potential barrier of the OFC unit may need to be maintained to be a constant value in all intervals, the potential barrier of the OFC unit may be changed without departing from a scope of the present invention. For example, when the potential barrier of the OFC unit is maintained to be higher than the potential barrier of the SS unit in several necessary intervals, it may be allowable to change the potential barrier of the OFC unit.

As described in the foregoing, a final image having an expanded DR may be obtained based on the obtained amount of the overflow charges and the amount of the PD charges. The final image having the expanded DR may be obtained based on a high-luminance image that may be obtained based on the obtained amount of the overflow charges and a low-luminance image that may be obtained based on the obtained amount of the PD charges.

3. An Automatic Selection of an Operating Mode

Figure 10:
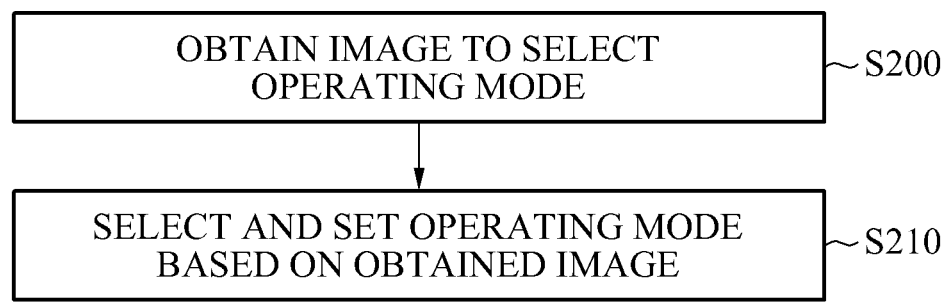
FIG. 10 is a flowchart illustrating a method of selecting an operating mode according to an embodiment of the present invention.
Figure 11A:
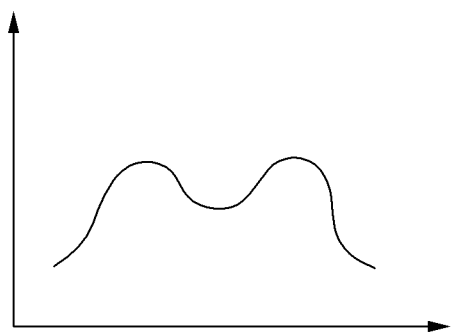
FIGS. 11A through 11C are examples of an image histogram for illustrating a method of selecting an operating mode according to an embodiment of the present invention.
Figure 11B:
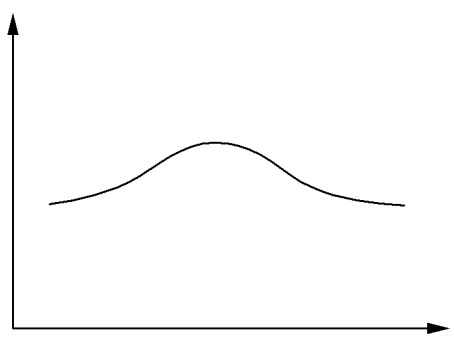
Figure 11C:
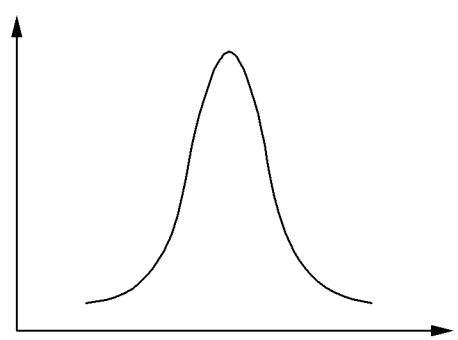

FIG. 10 is a flowchart illustrating a method of selecting an operating mode according to an embodiment of the present invention. FIGS. 11A through 11C are image histograms illustrating a method of selecting an operating mode according to an embodiment of the present invention.

Although the operating mode may be selected through a user interface (UI) based on a value input by a user, the operating mode may be automatically selected by determination of the imaging device 100 according to an embodiment of the present invention.

The imaging device 100 may include a mode selector (not shown) to select the operating mode. A method of automatically selecting the operating mode to be described hereinafter may be performed by the mode selector included in the imaging device 100.

The method of automatically selecting the operating mode will be further described hereinafter.

In operation 200, the imaging device 100 may obtain an image to select the operating mode.

The image obtained in operation 200 may be obtained by applying the imaging device 100 and the method of driving the imaging device 100 according to the foregoing embodiments of the present invention. For example, the image may be obtained based on the operating mode predetermined for the imaging device 100. When the predetermined operating mode is a second mode, the image obtained in operation 200 may be at least one of a high-luminance image obtained based on an amount of overflow charges, a low-luminance image obtained based on an amount of PD charges, and a final image obtained based on the high-luminance image and the low-luminance image.

However, the image to be obtained in operation 200 may be obtained by applying a method that may not be limited to the imaging device 100 and the method of driving the imaging device 100 according to the foregoing embodiments of the present invention.

A timing of obtaining the image in operation 200 may be determined within a period of time in which the operating mode is selected and set in operation 210 to be described hereinafter and a predetermined time range. For example, operation 200 may be performed prior to a predetermined time interval of, for example, one second, two seconds, and 0.5 seconds of performance of operation 210.

When a dynamic image is captured using the imaging device 100, the predetermined time interval may refer to a time interval between frames set in the imaging device 100. When the dynamic image includes a first frame and a second frame indicating a frame immediately next to the first frame, the first frame may be used to automatically select and set the operating mode and the second frame may be captured based on the operating mode selected and set based on the first frame. However, the frames are provided as an illustrative example, and an image or a frame to be used for the automatic selection and set of the operating mode may not be one immediately before an image or a frame to be captured, but one several images or frames before the image or the frame to be captured.

When a still image is captured using the imaging device 100, the still image may be obtained immediately after or before a signal used for capturing the still image, for example, a signal generated by the user pushing a shutter button. For example, when the still image is captured by the user pushing a shutter button, the image in operation 200 may be obtained before the shutter button is completely pushed as in a semi-shutter. The operating mode may be selected and set based on the obtained image and the still image may be obtained based on the operating mode set at a point in time when the shutter button is completely pushed.

In operation 210, the imaging device 100 may select and set the operating mode based on the obtained image.

To select and set the operating mode in operation 210, a method or a combination of methods to be described hereinafter may be used.

First, the imaging device 100 may verify a histogram with respect to the obtained image, and set the operating mode as a second mode, or a WDR mode, when attributes of the obtained image accord with predetermined standards based on the verified histogram.

For example, the imaging device 100 may obtain the histogram by analyzing the image obtained in operation 200. Accordingly, an intrascene dynamic range (IDR) of the obtained image may be determined. When histograms with respect to the obtained image are as illustrated in FIGS. 11A through 11C, the IDR of the obtained image with reference to each histogram may be determined. Referring to FIGS. 11A and 11B, histograms may be formed throughout a wide luminance range. Accordingly, the IDR of the obtained image may be determined to be wide. Referring to FIG. 11C, a histogram may be formed throughout a relatively narrow luminance range. Accordingly, the IDR of the obtained image may be determined to be narrow. Here, the imaging device 100 may preset a threshold IDR value, and set the operating mode as the second mode when a value of the IDR of the image obtained in operation 200 is greater than or equal to the preset threshold IDR value.

Although an example in which the operating mode is selected and set based solely on the IDR among the attributes of the obtained image is described hereinbefore, other attributes in addition to the IDR may be considered.

Second, the imaging device 100 may obtain at least two images in operation 200, verify a difference between the obtained images, and select and set the operating mode based on the verified difference. Here, the images may be obtained sequentially.

In general, a global shutter may be used to obtain an image of a fast moving object without image distortion.

In capturing a dynamic image, a movement of the object may be determined to be fast when the difference between the images obtained sequentially, for example, successive frames, is great.

Thus, the imaging device 100 may preset a threshold value of the difference between the images, and set the operating mode as the first mode, or a global shutter mode, when the difference between the images is greater than or equal to the preset threshold value. Although the imaging device 100 may verify the difference by obtaining two images, the imaging device 100 may verify the difference by obtaining at least three images and select and set the operating mode based on the difference between the at least three images.

When the user desires to capture a still image rather than a dynamic image using the imaging device 100, the imaging device 100 may obtain at least two images in operation 200 immediately before the still image is captured.

After the imaging device 100 automatically sets the operating mode, the imaging device 100 may operate in accordance with the set operating mode.

The imaging device 100 may continuously perform the foregoing operations to set the operating mode in real time or periodically. Alternatively, the imaging device 100 may perform the foregoing operations to set the operating mode only when the imaging device 100 receives a special request from the user.

A description of using an obtained image to automatically select the operating mode is provided in the foregoing. Here, a sensor used to obtain an image and a sensor used to automatically select the operating mode may be identical to each other. Alternatively, the sensors may not be identical. A sensor used to obtain the image to automatically select the operating mode may be separately provided.

4. Another Example of a Method of Driving a WDR Mode

The method of driving the imaging device 100 described with reference to FIGS. 7 through 9 may be an example of a method applied to achieve a WDR. A method of driving the imaging device 100 according to another embodiment of the present invention and a method to achieve the WDR will be described hereinafter. The method of driving the imaging device 100 according to another embodiment of the present invention may replace the method of driving the imaging device 100 to perform operations in the second mode. However, the method to be described hereinafter may be used to independently achieve the WDR.

Also, the method of driving the imaging device 100 according to another embodiment of the present invention may be performed in the pixel array 111 described with reference to FIG. 2. Alternatively, when the method of driving the imaging device 100 according to another embodiment of the present invention is separately used, the imaging device 100 may not include an OFC unit.

Figure 12:
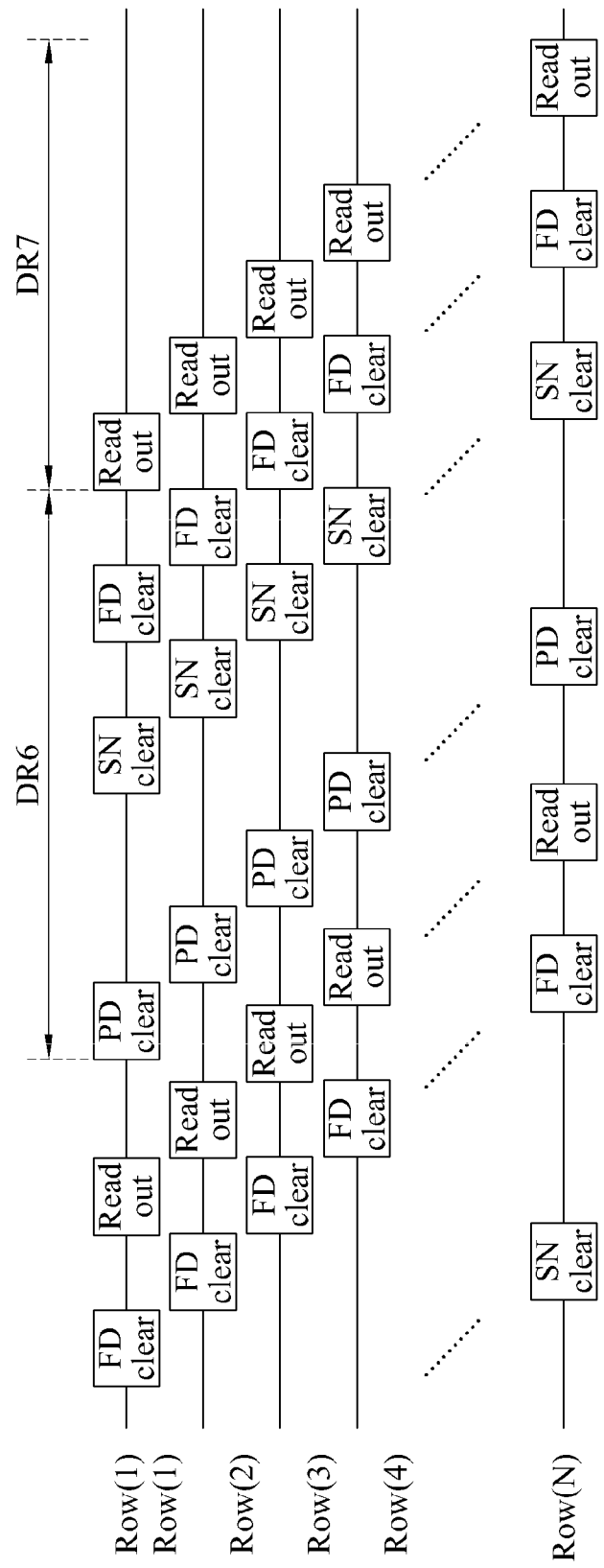
FIG. 12 is a timing diagram illustrating a method of driving a pixel array of an imaging device according to another embodiment of the present invention.
Figure 13:
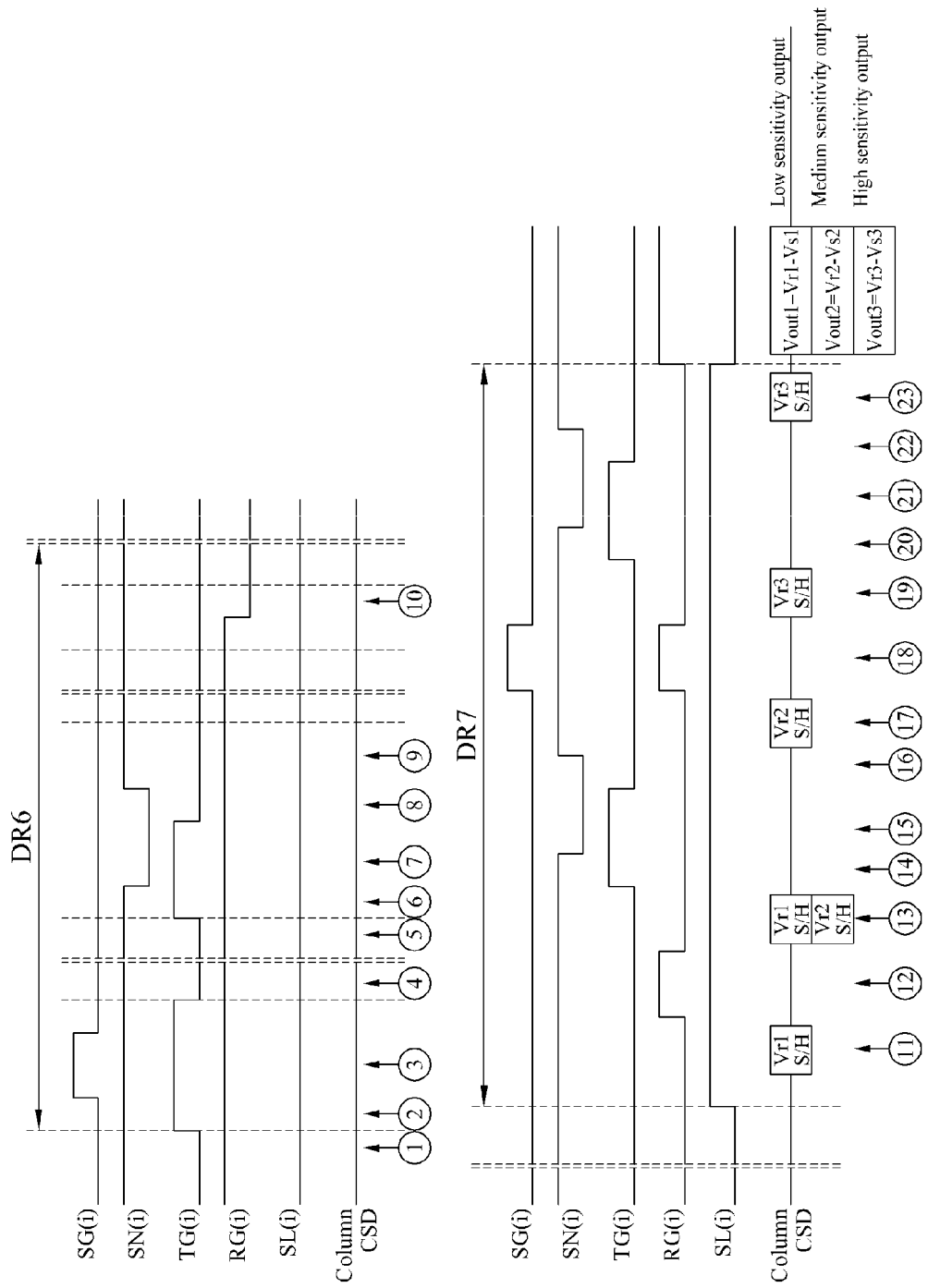
FIG. 13 is a timing diagram of control signals applied to respective components of a unit pixel of an imaging device according to another embodiment of the present invention.
Figure 14:
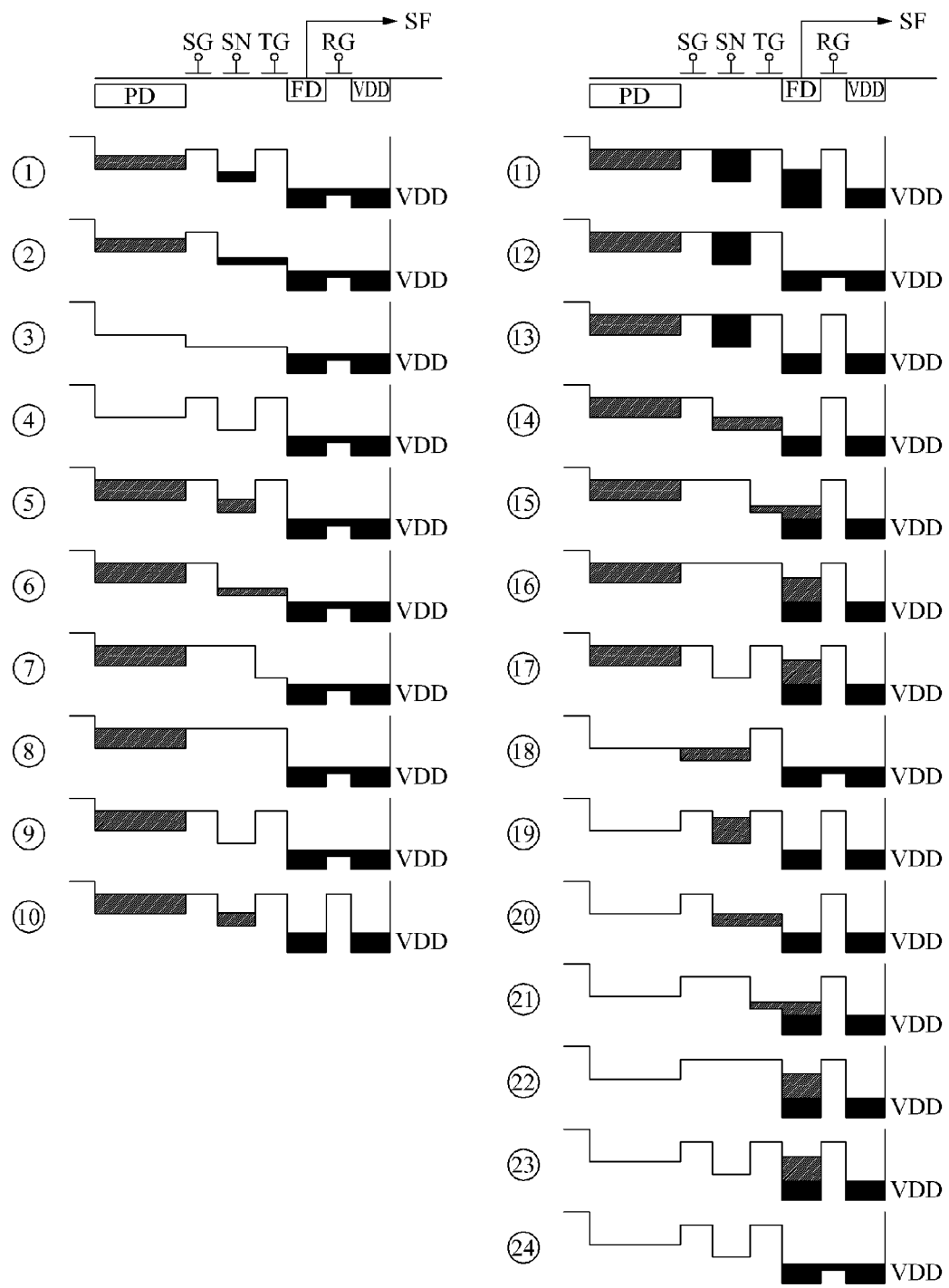
FIG. 14 is a diagram of a potential barrier for illustrating charge transfer in a unit pixel of an imaging device according to another embodiment of the present invention.

FIG. 12 is a timing diagram illustrating a method of driving the pixel array 111 of the imaging device 100 according to another embodiment of the present invention. FIG. 13 is a timing diagram of control signals applied to respective components of a unit pixel of the imaging device 100 according to another embodiment of the present invention. FIG. 14 is a diagram of a potential barrier for illustrating charge transfer in a unit pixel of the imaging device 100 according to another embodiment of the present invention.

Referring to FIG. 12, to obtain an image using the imaging device 100, the pixel array 111 may perform an integrating operation in a sixth duration (DR6) and a reading operation in a seventh duration (DR7).

The pixel array 111 may repeatedly perform the integrating operation and the reading operation in order, and an image may be obtained subsequent to completion of one set of the operations.

The integrating operation and the reading operation may not be simultaneously performed on all effective pixels. As illustrated in FIG. 12, the integrating operation and the reading operation may be simultaneously performed on effective pixels included in an identical column. However, the integrating operation and the reading operation may be performed on effective pixels included in different columns at different timings. Here, a sequential reading method based on a line may be adopted in lieu of a simultaneous reading method performed on all the effective pixels.

The integrating operation may include converting an incident light to an electrical charge by the PD. Also, the integrating operation may include a cleaning operation for the PD and/or an SN1 (hereinafter referred to as a third cleaning operation), a cleaning operation for the SN1 (hereinafter referred to as a fourth cleaning operation), and a cleaning operation for an SN2 (hereinafter referred to as a fifth cleaning operation). The integrating operation will be further described hereinafter.

The reading operation may include a third reading operation to read an amount of at least a portion of charges overflowing into the SN2 from the SN1, a fourth reading operation to read an amount of at least a portion of charges overflowing into the SN1 form the PD, and a fifth reading operation to read an amount of charges integrated in the PD.

A value of the amount of the charges read by the third reading operation may be used to obtain a high-luminance image. A value of the amount of the charges read by the fourth reading operation may be used to obtain a medium-luminance image. A value of the amount of the charges read by the fifth reading operation may be used to obtain a low-luminance image. Here, the third reading operation may be performed prior to the fourth reading operation. Similarly, the fourth reading operation may be performed prior to the fifth reading operation.

A period of time used for integration of the charges to be read by the third reading operation (hereinafter referred to as a third integration time [T3]) may be less than a period of time used for integration of the charges to be read by the fourth reading operation (hereinafter referred to as a fourth integration time [T4]). The T4 may be less than a period of time used for integration of the charges to be read by the fifth reading operation (hereinafter referred to as a fifth integration time [T5]). For example, the T3, the T4, and the T5 may have a following relationship.

$$1/5000 \leq T3/T4 \leq 1/5$$

$$1/5000 \leq T4/T5 \leq 1/5$$

When the method of driving the imaging device 100 according to another embodiment of the present invention is applied to replace the method of driving the imaging device 100 in the second mode, the OFC unit may not allow the charges integrated in the PD to be transferred to the OFC unit during the integrating operation and the reading operation. In other words, the OFC unit may be controlled to allow the charges not to be transferred to the OFC unit in all intervals. To this end, the OFC unit may maintain a high potential barrier. For example, when the OFC unit is provided in a form of a transistor, the transistor may maintain an off state. Here, maintaining a potential barrier of the OFC unit to be higher than a potential barrier of an SS unit may be preferable.

The integrating operation and the reading operation in each unit pixel will be further described with reference to FIGS. 13 and 14.

Referring to FIGS. 13 and 14, intervals (1) through (4) may correspond to the third cleaning operation through which each pixel eliminates charges unnecessarily integrated in the PD before the integrating operation is performed to integrate an amount of charges in the PD based on an incident light in order to obtain precise information on the incident light. The operations in intervals (1) through (4) may be identical or similar to operations in intervals (1) through (4) described with reference to FIG. 9 and thus, a repeated description will be omitted here for brevity.

In interval (5), the PD may integrate charges generated from incident light. Here, a potential barrier of an SS unit may be maintained to be high. The potential barrier of the SS unit may be controlled to be higher than a potential barrier of the PD. However, when the method of driving the imaging device 100 according to another embodiment of the present invention is applied to the second mode, the SS unit and an OFC unit may be controlled to allow the potential barrier of the SS unit to be maintained to be lower than the potential barrier of the OFC unit. Thus, a capacity of the PD may be determined by the potential barrier of the SS unit, in lieu of the potential barrier of the OFC unit.

Although overflow charges of the PD may overflow into an SN1 in interval (5) illustrated in FIG. 14, the charges may not overflow into the SN1 when the charges generated by the PD is less than the capacity of the PD in interval (5).

In general, the overflow charges of the PD may not be used to form an image, but eliminated. However, according to another embodiment of the present invention, the imaging device 100 and the method of driving the imaging device 100 may use at least a portion of the overflow charges of the PD to form the image.

During intervals (6) and (7), the fourth cleaning operation and the fifth cleaning operation may be performed to eliminate a portion of the charges overflowing from the PD and integrated in the SN1. In intervals (8) and (9), the SN1 may be prepared for reintegration of the charges overflowing form the PD. A description of intervals (6) through (9) may be substituted by the description of intervals (6) through (9) provided with reference to FIG. 9.

In interval (10), the charges overflowing into the SN1 the PD may be integrated in the SN1. When an amount of the charges overflowing into the SN1 form the PD is greater than a capacity of the SN1, the charges integrated in the SN1 may overflow. Here, the potential barrier of the TS unit may be controlled to be lower than or equal to the potential barrier of the SS unit so that the charges overflowing from the SN1 may overflow into the SN2.

In interval (11), a potential barrier of an RS unit may be changed to be high for integration of the charges overflowing from the SN1 in the SN2. The potential barrier of the RS unit may be controlled to be higher than the potential barrier of the SN2. For example, an RSx applied to the RS unit may be eliminated.

A timing at which an operation in interval (11) is performed may be determined based on the T3 used for integration of the charges to be read by the third reading operation.

Also, the third reading operation may be performed in interval (11). Here, an amount of the charges overflowing into the SN1 from the PD and overflowing into the SN2 form the SN1 may be read by the third reading operation.

The amount of the overflow charges obtained by the third reading operation may be used to obtain a high-luminance image and accordingly, a WDR may be achieved.

Although the T3 used for integration of the amount of the overflow charges to be read by the third reading operation may have a constant value, the value may depend on a result of analyzing at least one already obtained image and receiving feedback in real time or periodically. For example, when a luminance is determined to be very high as a result of the analyzing the at least one already obtained image, or the luminance is greater than or equal to a predetermined fifth luminance threshold, the T3 may be shorter than the T3 used to obtain a previous image. Conversely, when the luminance is not determined to be very high as a result of the analyzing the at least one already obtained image, or the luminance is less than or equal to a predetermined sixth luminance threshold, the T3 may be shorter than the T3 used to obtain the previous image.

Although the T3 may be identically applied to all effective pixels included in the pixel array 111, the T3 may be differently set for each effective pixel. For example, a luminance distribution for each effective pixel may be verified by analyzing the at least one already obtained image and thus, the T3 to be applied to each pixel may be differently set based on the luminance distribution for each effective pixel.

The T3 relates closely to expansion of a DR to be achieved according to another embodiment of the present invention and thus, the T3 may be controlled by applying various methods that may not be limited to the foregoing descriptions.

In interval (12), the charges integrated in the SN2 may be reset. The potential barrier of the RS unit may be changed to be low so that the charges integrated in the SN2 may escape to the first terminal of the RS unit to which a VDD is applied.

During intervals (13) through (17), the fourth reading operation may be performed. The amount of the charges overflowing into the SN1 from the PD and integrated in the SN1 may be read. To this end, the charges integrated in the SN1 may be transferred to the SN2 throughout intervals (14) through (16), and the amount of the charges integrated in the SN2 may be read in interval (17). A detailed description may be substituted by the description of the intervals (10) through (15) provided with reference to FIG. 9.

The amount of the PD charges obtained by the fourth reading operation may be used to obtain a medium-luminance image and accordingly, the WDR may be achieved.

Although the T4 used for integration of the amount of the overflow charges read by the fourth reading operation may have a constant value, the value may depend on a result of analyzing at least one already obtained image and receiving feedback in real time or periodically. For example, when a luminance is determined to be very high as a result of the analyzing the at least one already obtained image, or the luminance is greater than or equal to a predetermined seventh luminance threshold, the T4 may be shorter than the T4 used to obtain a previous image. Conversely, when the luminance is not determined to be very high as a result of the analyzing the at least one already obtained image, or the luminance is less than or equal to a predetermined eighth luminance threshold, the T4 may be longer than the T4 used to obtain the previous image.

Although the T4 may be identically applied to all effective pixels included in the pixel array 111, the T4 may be differently set for each effective pixel. For example, a luminance distribution for each effective pixel may be verified by analyzing the at least one already obtained image and thus, the T4 to be applied to each pixel may be differently set based on the luminance distribution for each effective pixel.

The T4 relates closely to expansion of the DR to be achieved according to another embodiment of the present invention and thus, the T4 may be controlled by applying various methods that may not be limited to the foregoing descriptions.

During intervals (18) through (23), the fifth reading operation may be performed. The charges generated by the PD due to the incident light and integrated in the PD may be transferred to the SN2 through the SN1. Subsequently, an amount of the charges transferred to the SN2 may be read by the fifth reading operation. The fifth reading operation performed throughout intervals (18) through (23) may be identical or similar to the operations performed throughout intervals (16) through (22) described with reference to FIG. 9.

The amount of the overflow charges obtained by the fifth reading operation may be used to obtain a low-luminance image and accordingly, the WDR may be achieved.

Although the T5 used for integration of the amount of the overflow charges to be read by the fifth reading operation may have a constant value, the value may depend on a result of analyzing at least one already obtained image and receiving feedback in real time or periodically. For example, when a luminance is determined to be very high as a result of analyzing the at least one already obtained image, or the luminance is greater than or equal to a predetermined ninth luminance threshold, the T5 may be shorter than the T5 used to obtain a previous image. Conversely, when the luminance is not determined to be very high as a result of analyzing the at least one already obtained image, or the luminance is less than or equal to a predetermined tenth luminance threshold, the T5 may be longer than the T5 used to obtain the previous image.

Although the T5 may be identically applied to all effective pixels included in the pixel array 111, the T5 may be differently set for each effective pixel. For example, a luminance distribution for each effective pixel may be verified by analyzing the at least one already obtained image and thus, the T5 to be applied to each pixel may be differently set based on the luminance distribution for each effective pixel.

The T5 relates closely to expansion of the DR to be achieved according to another embodiment of the present invention and thus, the T5 may be controlled by applying various methods that may not be limited to the foregoing descriptions.

Each unit pixel may repeatedly perform the operations described in the foregoing. More particularly, each unit pixel may re-perform the operations of intervals (1) through (23) subsequent to completion of the operations performed throughout intervals (1) through (23).

According to another embodiment of the present invention, at least a portion of the charges overflowing into the SN1 may be used to obtain an image. Thus, the imaging device 100 may be allowed to have a wider DR by applying the method of driving the imaging device 100 according to another embodiment of the present invention than by applying the method described with reference to FIG. 9.

According to embodiments of the present invention, an imaging device and a method of driving the imaging device may suitably and differently control a potential barrier formed by an overflow control unit and a potential barrier formed by a shift switching unit based on a set operating mode and accordingly, selectively perform an operation to achieve a WDR and an operation for a global shutter using an identical pixel array.

According to embodiments of the present invention, an imaging device and a method of driving the imaging device may use at least a portion of charges overflowing into a first storage node from a photodiode and accordingly, easily achieve a WDR.

According to embodiments of the present invention, an imaging device and a method of driving the imaging device may use both at least a portion of charges overflowing into a first storage node from a photodiode and at least a portion of charges overflowing into a floating diffusion node from the first storage node and accordingly, easily achieve a WDR and capture an image in a wider DR.

According to embodiments of the present invention, an imaging device and a method of driving the imaging device may automatically select and set an operating mode based on an obtained image and accordingly, more easily set a more suitable operating mode.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An imaging device, comprising:
   a pixel; and
   a control circuit to apply a signal to the pixel,
   wherein the pixel comprises:
   a photodiode;
   a shift switching unit to be disposed at one side of the photodiode;
   a first storage node to be disposed at one side of the shift switching unit;
   a transfer switching unit to be disposed at one side of the first storage node;
   a second storage node to be disposed at one side of the transfer switching unit; and
   a reset switching unit to be disposed at one side of the second storage node,
   wherein the control circuit performs a first reading operation to read an amount of charges stored in the photodiode, a second reading operation to read an amount of charges overflowing into the first storage node from the photodiode and stored in the first storage node, and a third reading operation to read an amount of charges overflowing into the second storage node from the first storage node,
   wherein the first storage node comprise a gate configured to get a signal controlling potential barrier of the first storage node,
   wherein a first integration time, a second integration time and a third integration time are adjusted based on luminance of an obtained image,
   wherein each of the first integration time, the second integration time and the third integration time is used for integration of an amount of the charges to be read by each of the first reading operation, the second reading operation and the third reading operation.

2. The imaging device of claim 1, wherein the first reading operation comprises reading the amount of the charges by shifting the charges stored in the photodiode to the second storage node through the first storage node.

3. The imaging device of claim 1, wherein the second reading operation comprises reading the amount of the charges by shifting the charges overflowing into the first storage node from the photodiode and stored in the first storage node to the second storage node.

4. The imaging device of claim 1, wherein the second storage node is a floating diffusion node.

5. The imaging device of claim 1, wherein after the photodiode is reset, the control circuit does not turn on the transfer switching unit before the third reading operation is performed.

6. The imaging device of claim 1, wherein after the photodiode is reset, the control circuit does not turn on the transfer switching unit before the second reading operation is performed.

7. The imaging device of claim 1, wherein the control circuit performs the second reading operation subsequent to the third reading operation, and performs the first reading operation subsequent to the second reading operation.

8. The imaging device of claim 1, wherein the first integration time is longer than the second integration time.

9. The imaging device of claim 8, wherein the second integration time is determined within a range between greater than or equal to $1/5000$ of the first integration time and less than or equal to $1/5$ of the first integration time.

10. The imaging device of claim 1, wherein the second integration time is longer than the third integration time.

11. The imaging device of claim 10, wherein the third integration time is determined within a range between greater than or equal to $1/5000$ of the second integration time and less than or equal to $1/5$ of the second integration time.

* * * * *